(12) United States Patent
Sebastian et al.

(10) Patent No.: US 12,256,172 B2
(45) Date of Patent: Mar. 18, 2025

(54) ADVANCED MANUFACTURING TECHNOLOGIES AND MACHINE LEARNING IN UNMANNED AVIATION SYSTEMS

(71) Applicant: Booz Allen Hamilton Inc., McLean, VA (US)

(72) Inventors: Jason Sebastian, Madison, AL (US); Robyn Kincade, Athens, AL (US); Catherine Henderson, Madison, AL (US); Bradley Evans, Huntsville, AL (US); Jacques Davignon, Atlanta, GA (US); Ryan Fernandez, Huntsville, AL (US); Jeff Dowell, Huntsville, AL (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 18/058,492

(22) Filed: Nov. 23, 2022

(65) Prior Publication Data

US 2023/0154180 A1 May 18, 2023

Related U.S. Application Data

(62) Division of application No. 16/271,987, filed on Feb. 11, 2019, now abandoned.

(51) Int. Cl.
*B64U 20/40* (2023.01)
*B33Y 80/00* (2015.01)
(Continued)

(52) U.S. Cl.
CPC ............... *H04N 7/12* (2013.01); *B33Y 80/00* (2014.12); *B64C 1/16* (2013.01); *B64D 27/24* (2013.01);
(Continued)

(58) Field of Classification Search
CPC ...... B64U 20/40; B64U 30/291; B64U 20/80; B64U 10/14
See application file for complete search history.

(56) References Cited

U.S. PATENT DOCUMENTS 9,016,617 B2 4/2015 Wang et al.
9,221,536 B2 12/2015 Wang et al.
(Continued)

FOREIGN PATENT DOCUMENTS

WO 2019010699 A1 1/2019

*Primary Examiner* — Philip J Bonzell
(74) *Attorney, Agent, or Firm* — Buchanan Ingersoll & Rooney PC

(57) ABSTRACT

A vehicle can be configured to include a body having a body bottom conjoined with a body sidewall and a body top forming a body cavity. The body top includes a body top opening and the body sidewall includes a body sidewall opening. The vehicle can include a payload housing having a payload bottom conjoined with a payload housing sidewall and a payload housing top forming a payload housing cavity, wherein the payload housing cavity is configured to hold at least one operating module for the vehicle. The vehicle can include at least one arm. The vehicle can include at least one interlocking arrangement of the body top opening or body side wall configured to removably secure the payload housing and the at least one arm to the body. Each of the body, the payload housing, and the at least one arm can be structured with additive manufactured material.

35 Claims, 19 Drawing Sheets

(51) Int. Cl.

| | | |
|---|---|---|
| *B64C 1/16* | (2006.01) | |
| *B64D 27/24* | (2006.01) | |
| *B64F 5/10* | (2017.01) | |
| *B64U 10/14* | (2023.01) | |
| *B64U 10/70* | (2023.01) | |
| *B64U 20/73* | (2023.01) | |
| *B64U 20/80* | (2023.01) | |
| *B64U 30/291* | (2023.01) | |
| *B64U 50/19* | (2023.01) | |
| *G01C 21/20* | (2006.01) | |
| *G01S 19/24* | (2010.01) | |
| *G06F 18/24* | (2023.01) | |
| *G06N 7/01* | (2023.01) | |
| *G06N 20/00* | (2019.01) | |
| *G06T 7/70* | (2017.01) | |
| *G06V 20/13* | (2022.01) | |
| *G06V 20/17* | (2022.01) | |
| *G06V 20/52* | (2022.01) | |
| *H04N 7/12* | (2006.01) | |
| *H04Q 9/00* | (2006.01) | |
| *B33Y 10/00* | (2015.01) | |
| *B64U 101/31* | (2023.01) | |
| *G06V 20/56* | (2022.01) | |

(52) U.S. Cl.
CPC .............. *B64F 5/10* (2017.01); *B64U 10/14* (2023.01); *B64U 10/70* (2023.01); *B64U 20/40* (2023.01); *B64U 20/73* (2023.01); *B64U 20/80* (2023.01); *B64U 30/291* (2023.01); *B64U 50/19* (2023.01); *G01C 21/20* (2013.01); *G01S 19/24* (2013.01); *G06F 18/24* (2023.01); *G06N 7/01* (2023.01); *G06N 20/00* (2019.01); *G06T 7/70* (2017.01); *G06V 20/13* (2022.01); *G06V 20/17* (2022.01); *G06V 20/52* (2022.01); *H04Q 9/00* (2013.01); *B33Y 10/00* (2014.12); *B64U 2101/31* (2023.01); *B64U 2201/10* (2023.01); *G06T 2207/20076* (2013.01); *G06T 2207/20081* (2013.01); *G06T 2207/30232* (2013.01); *G06T 2207/30252* (2013.01); *G06V 20/56* (2022.01); *H04Q 2209/40* (2013.01)

(56) References Cited

U.S. PATENT DOCUMENTS

| | | | |
|---|---|---|---|
| 9,221,537 | B2 | 12/2015 | Wang et al. |
| 9,233,754 | B1 | 1/2016 | Wang et al. |
| 9,284,049 | B1 | 3/2016 | Wang et al. |
| 9,321,530 | B2 | 4/2016 | Wang et al. |
| 9,394,048 | B2 | 7/2016 | Wang et al. |
| 9,650,134 | B2 | 5/2017 | Chappell |
| 9,738,380 | B2 * | 8/2017 | Claridge .............. B64C 39/024 |
| 9,815,554 | B2 | 11/2017 | Plater |
| 10,155,584 | B2 | 12/2018 | Wang et al. |
| 10,179,647 | B1 | 1/2019 | Meugnier et al. |
| 10,189,562 | B2 | 1/2019 | Wang et al. |
| 10,196,137 | B2 | 2/2019 | Wang et al. |
| 10,272,994 | B2 | 4/2019 | Wang et al. |
| 10,377,469 | B2 | 8/2019 | Vance et al. |
| 10,472,056 | B2 | 11/2019 | Wang et al. |
| 10,479,500 | B2 * | 11/2019 | Claridge ................ B64U 20/80 |
| 10,710,717 | B2 | 7/2020 | Raffler et al. |
| 10,906,652 | B2 | 2/2021 | Ku et al. |
| 11,040,763 | B2 * | 6/2021 | Xiong ................... B64C 39/024 |
| 11,141,673 | B1 * | 10/2021 | Wood .................. B64U 30/291 |
| 11,541,996 | B2 * | 1/2023 | Kim ....................... B64U 50/19 |
| 2012/0083945 | A1 * | 4/2012 | Oakley .................. B64U 20/96 701/2 |
| 2014/0131510 | A1 * | 5/2014 | Wang ...................... B64C 27/08 244/17.23 |
| 2015/0060606 | A1 | 3/2015 | Wang et al. |
| 2015/0069174 | A1 | 3/2015 | Wang et al. |
| 2016/0031558 | A1 | 2/2016 | Wang et al. |
| 2016/0075431 | A1 | 3/2016 | Wang et al. |
| 2016/0083084 | A1 | 3/2016 | Wang et al. |
| 2016/0159473 | A1 | 6/2016 | Wang et al. |
| 2016/0244162 | A1 | 8/2016 | Weller |
| 2016/0355257 | A1 | 12/2016 | Chappell |
| 2016/0376004 | A1 * | 12/2016 | Claridge ................. B64C 1/30 701/3 |
| 2017/0036748 | A1 | 2/2017 | Plater |
| 2017/0121016 | A1 | 5/2017 | Wang et al. |
| 2017/0247110 | A1 | 8/2017 | Chappell |
| 2017/0253319 | A1 | 9/2017 | Vance et al. |
| 2018/0170539 | A1 * | 6/2018 | Claridge ................ G05D 1/106 |
| 2018/0186471 | A1 | 7/2018 | Hutson et al. |
| 2018/0208336 | A1 | 7/2018 | Colson et al. |
| 2018/0229834 | A1 | 8/2018 | Wang et al. |
| 2018/0281935 | A1 | 10/2018 | Wang et al. |
| 2018/0354622 | A1 | 12/2018 | Raffler et al. |
| 2019/0002094 | A1 | 1/2019 | Wang et al. |
| 2019/0016460 | A1 | 1/2019 | Meugnier et al. |
| 2019/0033932 | A1 | 1/2019 | Ku et al. |
| 2019/0135403 | A1 | 5/2019 | Perry et al. |
| 2019/0217939 | A1 * | 7/2019 | Xiong .................. H05K 5/0008 |
| 2019/0276141 | A1 | 9/2019 | Wang et al. |
| 2019/0322362 | A1 | 10/2019 | Santangelo et al. |
| 2019/0337618 | A1 * | 11/2019 | Zhou ...................... B64U 20/70 |
| 2020/0122828 | A1 * | 4/2020 | Kim ....................... B64C 11/20 |
| 2020/0164971 | A1 | 5/2020 | Wang et al. |
| 2020/0223558 | A1 | 7/2020 | Feng et al. |
| 2020/0257904 | A1 | 8/2020 | Sebastian et al. |
| 2020/0346777 | A1 * | 11/2020 | Tong .................... H05K 7/20172 |
| 2021/0206480 | A1 | 7/2021 | Santangelo et al. |
| 2021/0309342 | A1 * | 10/2021 | Xiong ................... B64C 39/024 |

\* cited by examiner

ADVANCED MANUFACTURING TECHNOLOGIES AND MACHINE LEARNING IN UNMANNED AVIATION SYSTEMS

FIELD

Embodiments relate to a vehicle composed of additive manufactured parts configured to be assembled in a tool-less fashion. The vehicle can include an operating module configured to function as a surveillance system that identifies objects within an environment and to reduce the data bandwidth that would otherwise be needed to transmit data from the vehicle to another device. The operating module can be configured to transmit object coordinates with object recognition information as part of the data being transmitted to the other device.

BACKGROUND INFORMATION

Known unmanned vehicles and reconnaissance systems are limited in that they are designed to operate in a single operational mode. There is no means to configure and re-configure the vehicle to meet different operational criteria. Known vehicles and systems do not provide a vehicle platform made of modular components that can be assembled and dis-assembled for re-configuration in a simple and efficient manner. In addition, known systems rely on transmitting full video streams from the vehicle to a receiver, which requires significant data bandwidth.

SUMMARY

Embodiments can relate to a vehicle having a body bottom conjoined with a body sidewall and a body top forming a body cavity, wherein the body top includes a body top opening and the body sidewall includes a body sidewall opening. The vehicle can include a payload housing having a payload bottom conjoined with a payload housing sidewall and a payload housing top forming a payload housing cavity, wherein the payload housing cavity is configured to hold at least one operating module for the vehicle. The vehicle can include at least one arm. The vehicle can include at least one interlocking arrangement of the body top opening or body side wall configured to removably secure the payload housing and the at least one arm to the body. Each of the body, the payload housing, and the at least one arm can be structured with additive manufactured material.

Embodiments can relate to a method of using a vehicle. The method of using a vehicle can involve manually assembling a payload housing and at least one arm to a body via at least one interlocking arrangement used to secure the payload housing to the body, and the at least one arm to the body. The method of using a vehicle can involve manually attaching at least one motor to the at least one arm.

Embodiments can relate to an operating module for a vehicle, the operating module having a navigation module including a navigation processor and a navigation sensor, the navigation module configured to communicate with at least one motor of the vehicle to facilitate navigation and propulsion of the vehicle. The operating module can include a surveillance module including a surveillance processor and a surveillance sensor, the surveillance module configured to: receive raw data, the raw data including real time video stream information about an environment; and generate distilled data, the distilled data including still image information from the real time video stream information, the still image information including at least one object identified via an object classification and localization technique. The operating module can include a telemetry module including a telemetry processor and a telemetry transceiver, the telemetry module configured to transmit the distilled data to a computer device.

Embodiments can relate to a method of surveillance involving receiving raw data at a first data bandwidth, the raw data including real time video stream information about an environment. The method of surveillance can involve generating distilled data, the distilled data including still image information from the real time video stream information, the still image information including at least one object identified via an object classification and localization technique. The method of surveillance can involve transmitting the distilled data at a second data bandwidth, the first data bandwidth being greater than the second data bandwidth.

Embodiments can relate to an operating module for a vehicle, the operating module having a navigation module including a navigation processor and a navigation sensor, the navigation module configured to communicate with a motor of the vehicle for navigation and propulsion of the vehicle. The operating module can include a surveillance module including a surveillance processor and a surveillance sensor, the surveillance module configured to: receive raw data, the raw data including real time video stream information about an environment; and process the raw data to generate distilled data, the distilled data including a still image information from the real time video stream information, the still image information including at least one object identified via an object classification and localization technique. The operating module can include a telemetry module including a telemetry processor and a telemetry transceiver, the telemetry module configured to transmit the distilled data to a computer device. The navigation module can generate vehicle coordinates and the surveillance module can use the vehicle coordinates and a ranging technique to generate object coordinates for the at least one object. The surveillance module can co-register the object coordinates with the at least one object and include the co-register object coordinates as part of the distilled data.

Embodiments can relate to a method of surveillance involving receiving raw data at a first data bandwidth, the raw data including real time video stream information about an environment. The method of surveillance can involve generating distilled data from the raw data, the distilled data including a still image information from the real time video stream information, the still image information including at least one object identified via an object classification and localization technique. The method of surveillance can involve co-registering object coordinates for the at least one identified object as part of the distilled data. The method of surveillance can involve transmitting distilled data at a second data bandwidth.

Embodiments can relate to a vehicle having a body including at least one mount, each mount configured to secure a motor. The vehicle can have a payload including at least one operating module for the vehicle. The vehicle can have at least one interlocking arrangement configured to removably secure the payload to the body. The body can be structured with additive manufactured material.

Embodiments can relate to a method of producing a vehicle involving generating a body via additive manufacturing. The method can involve and generating a payload including at least one operating module for the vehicle. At least one interlocking arrangement can be included in or on the body and configured to removably secure the payload to the body by manual assembly.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein.

DETAILED DESCRIPTION

Figure 1:
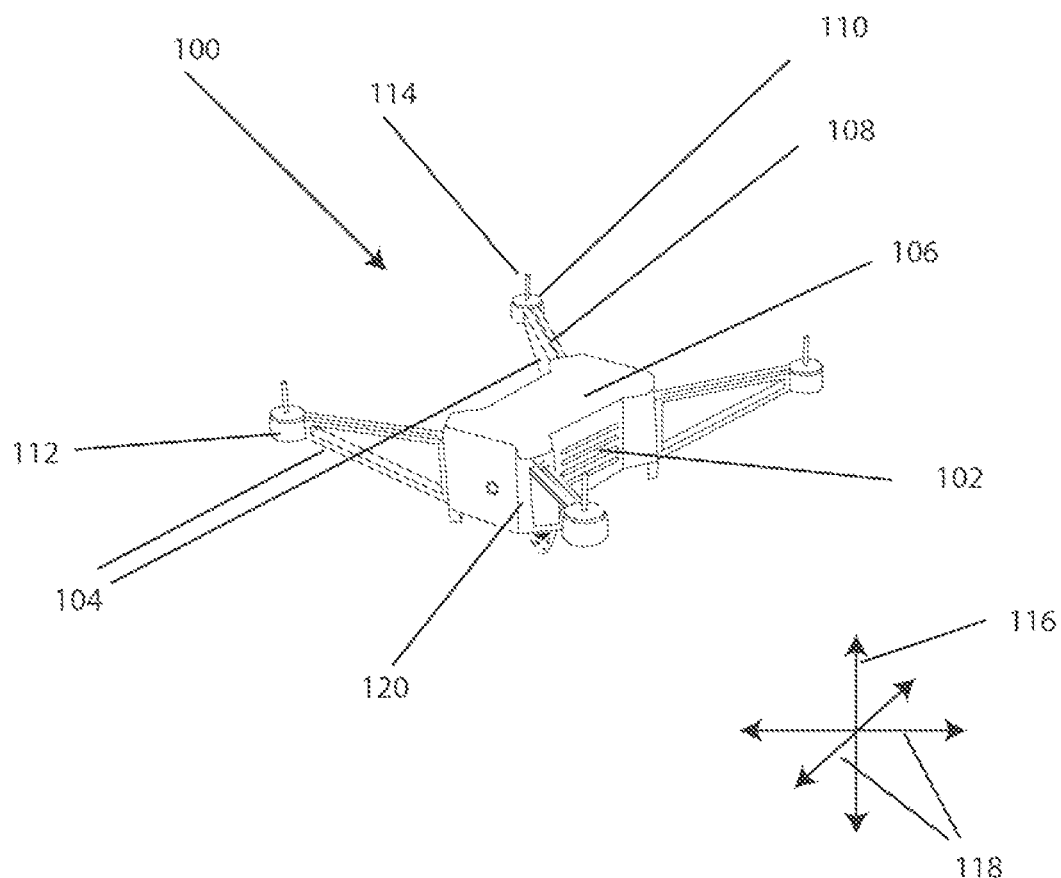
FIG. 1 shows an exemplary embodiment of the vehicle.
Figure 2:
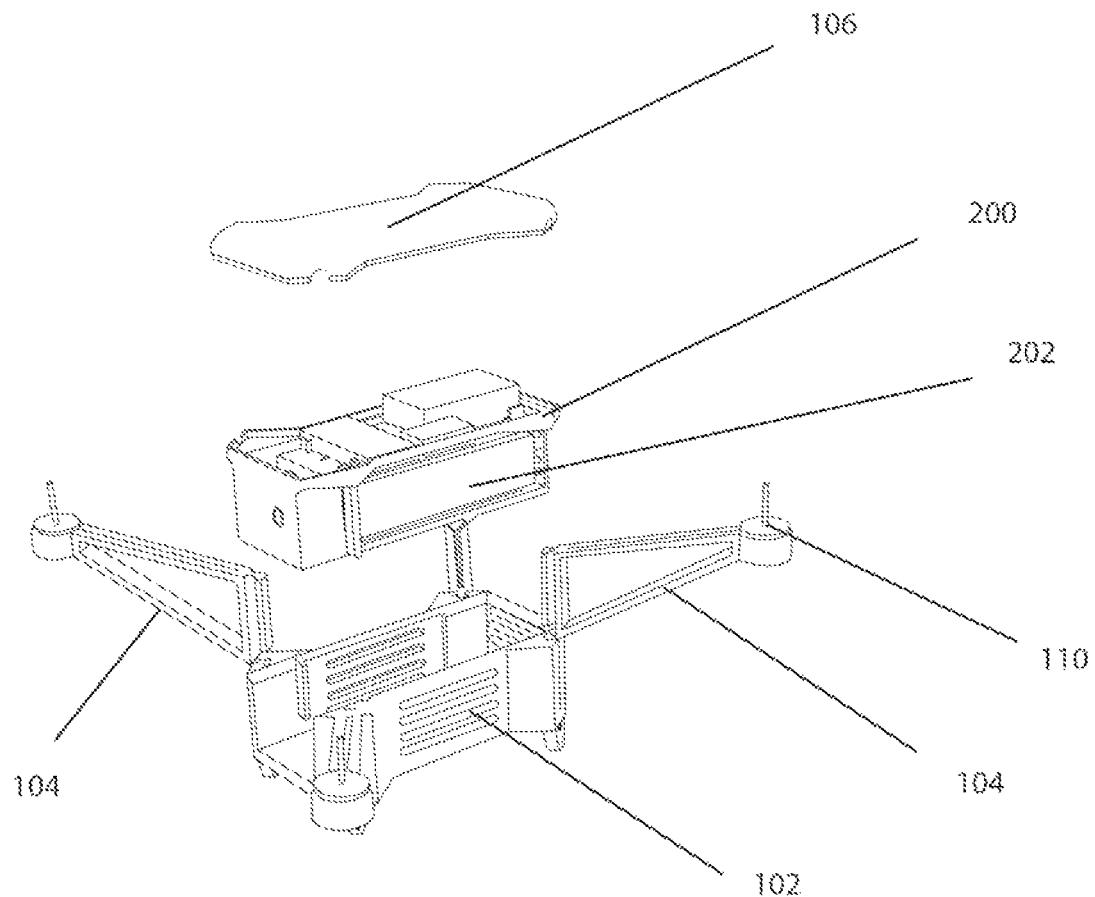
FIG. 2 shows an exemplary embodiment of the vehicle as an exploded view of exemplary component parts of the vehicle.
Figure 3:
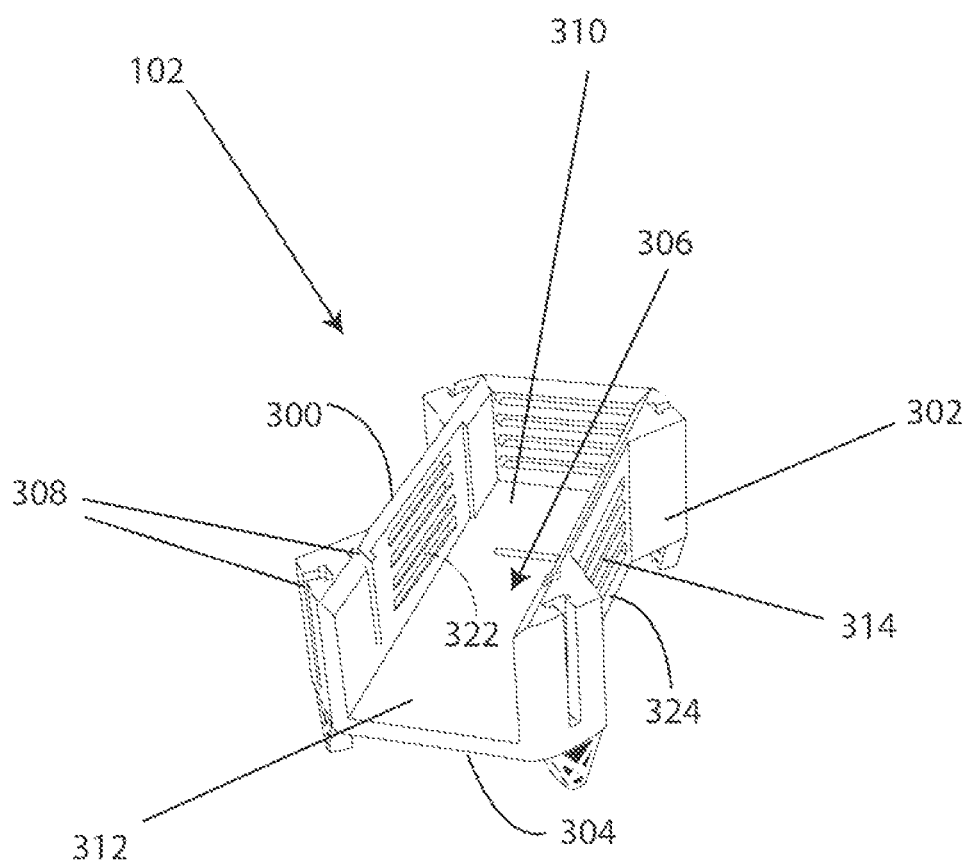
FIG. 3 shows an exemplary embodiment of the body portion of an embodiment of the vehicle.
Figure 4:
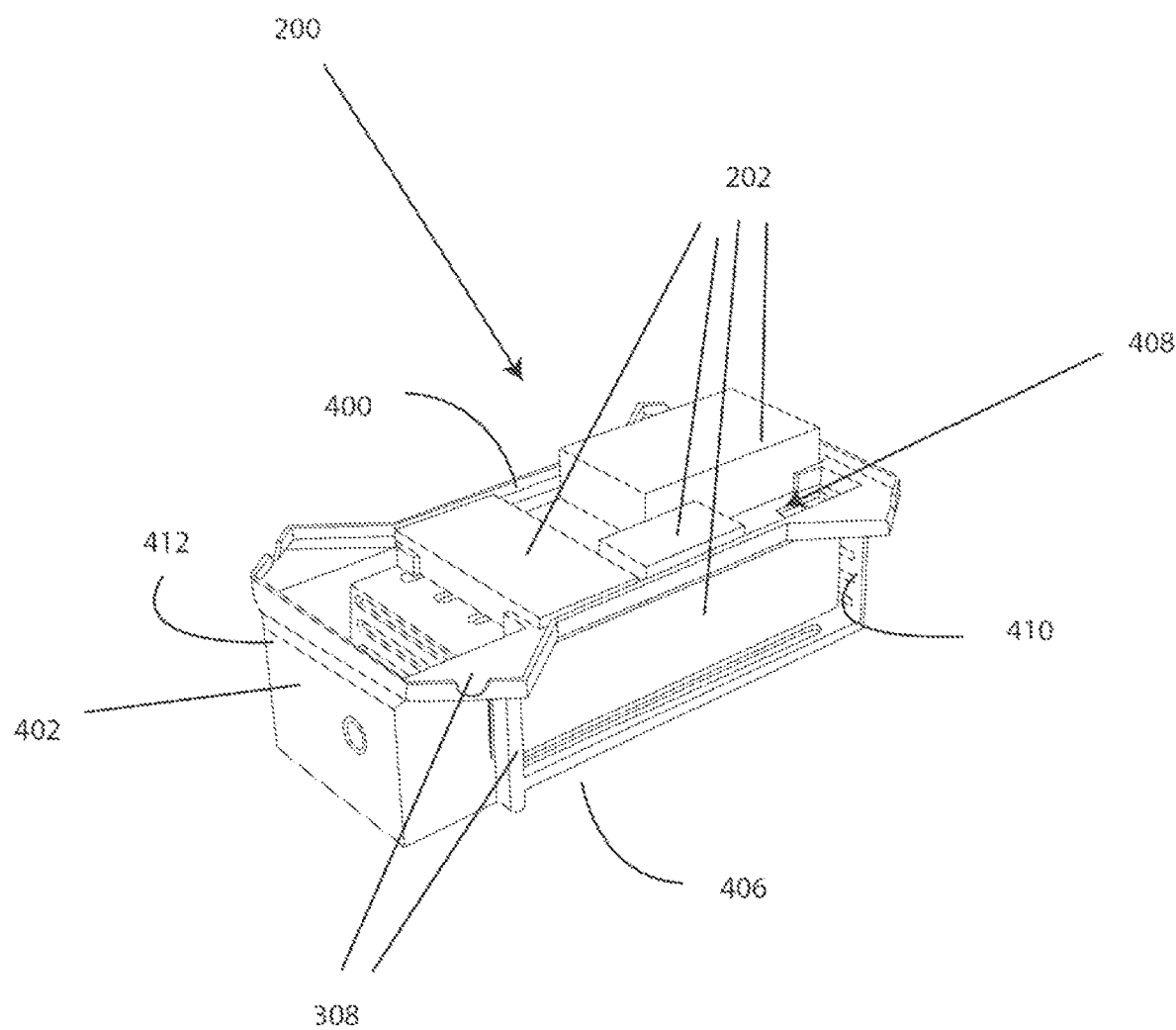
FIG. 4 shows an exemplary embodiment of the payload housing portion of an embodiment of the vehicle.
Figure 5:
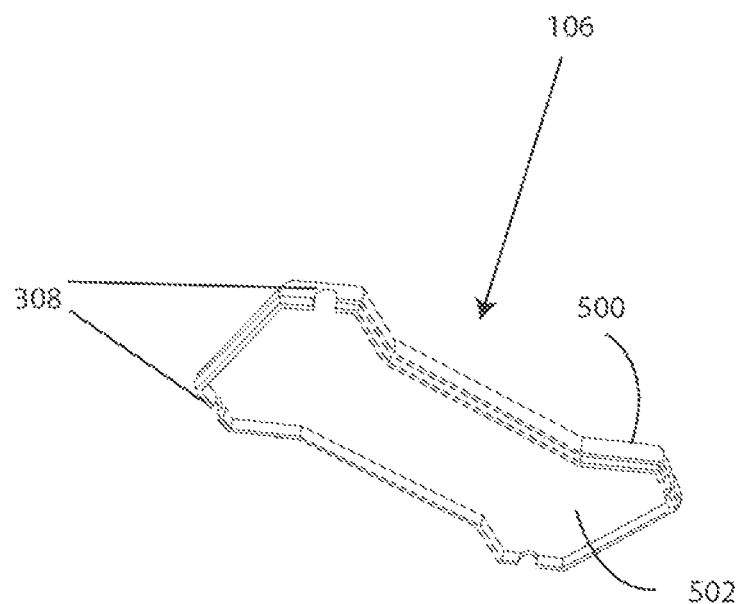
FIG. 5 shows an exemplary embodiment of the cover portion of an embodiment of the vehicle.
Figure 6:
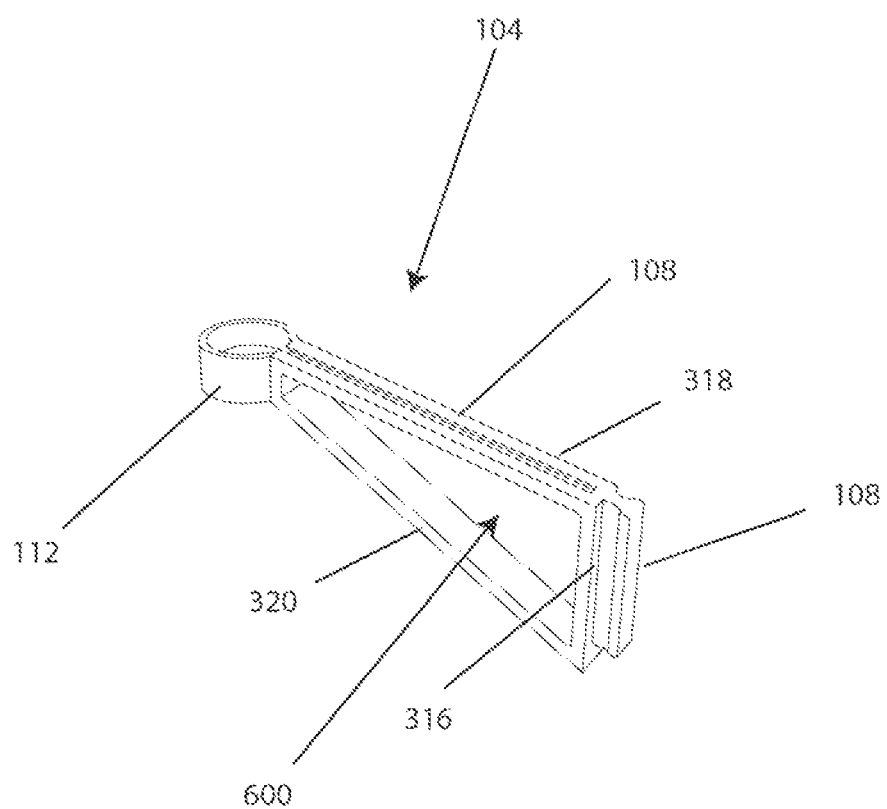
FIG. 6 shows an exemplary embodiment of the arm portion of an embodiment of the vehicle.
Figure 7:
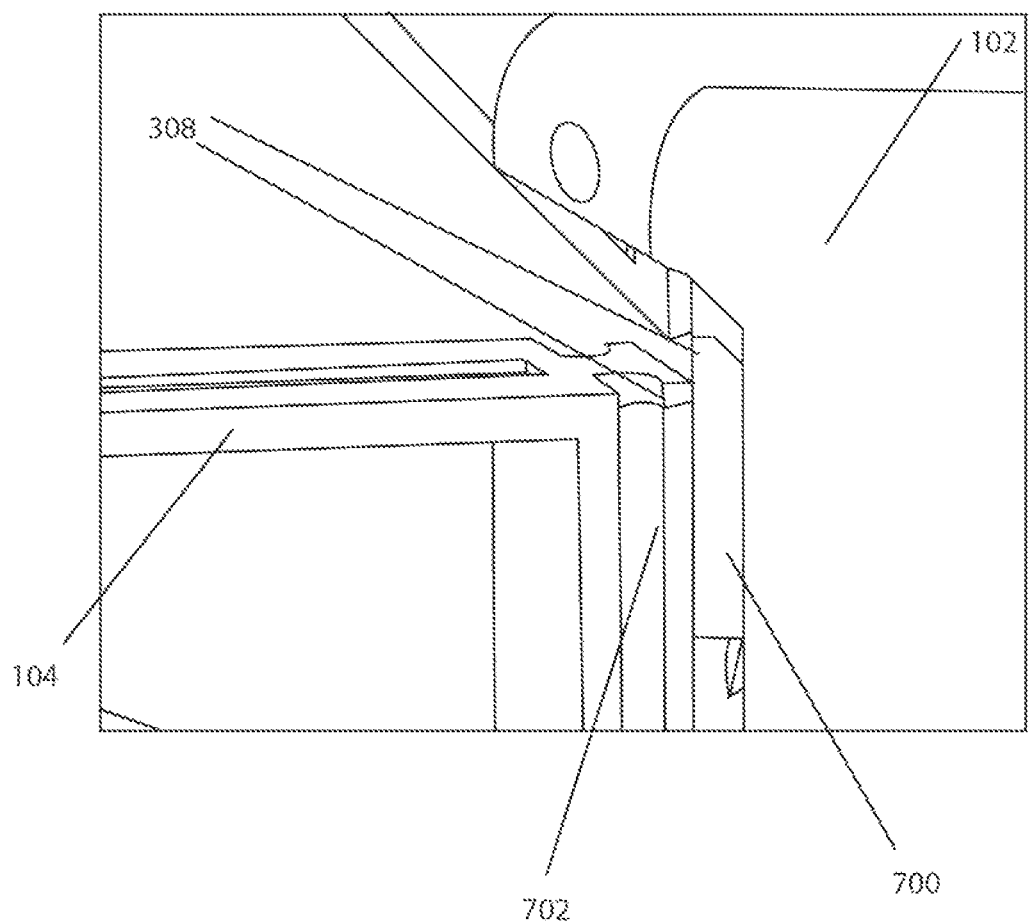
FIG. 7 shows an exemplary embodiment of the interlocking arrangement portion of an embodiment of the vehicle.

Embodiments can include a vehicle 100 (e.g., unmanned vehicle) composed of additive manufactured parts configured to be assembled in a tool-less fashion. It is contemplated for the vehicle 100 to be an unmanned vehicle and used for surveillance or reconnaissance. Surveillance and reconnaissance can involve receiving data regarding an environment, processing the data, and transmitting the data to a computer device 1712 for review or further analysis or further processing. The vehicle 100 can include an operating module 202 configured to reduce the data bandwidth that would otherwise be needed to transmit data (e.g., surveillance data) from the vehicle 100 to another device (e.g., computer device 1712). The operating module 202 can be configured to transmit object coordinates with object recognition information as part of the data being transmitted to the computer device 1712. The surveillance and reconnaissance can involve receiving data about objects within the environment. For instance, the vehicle 100 can be used for surveillance and reconnaissance of an area of operation (AOO) or area of interest (AOI) identified by military personnel, police personnel, emergency or first responders, researchers, scientists, investigators, explorers, enthusiasts etc. The vehicle 100 can be used to identify and track personnel or objects in the AOO or AOI, identify and track phenomenon (e.g., weather events, geological events, etc.), hazardous conditions, etc. The vehicle 100 can be operated remotely by a user, can be operated autonomously, or can be operated semi-autonomously. It is also contemplated for the vehicle 100 to be transportable by a single person with ease and to be assembled, dis-assembled, and/or re-configured with minimal effort and without the use of tools.

Embodiments of the vehicle 100 can be structured so as to allow the vehicle 100 to be expendable. For instance, the vehicle 100 can be used to carry out a surveillance and reconnaissance task, and then be allowed to self-destruct, crash, or remain in the AOO or AOI without returning. This can be achieved by the specific configuration of component parts (e.g., the body 102, the payload housing 200, the arm 104, etc.) and methods for implementation that allow for the construction of a reliable and effective vehicle 100 at a low cost and with the use of minimal resources.

Embodiments of the vehicle 100 can be structured so that the component parts are assembled in a modular fashion. This can allow the vehicle 100 to be configured and re-configured by a user and on-the-fly to meet specific design criteria or perform a specific type of surveillance and reconnaissance. In addition, components of the vehicle 100 can be easily replaced and/or manufactured with the use of additive manufacturing machines. This further leads to the reliability, versatility, and expendability of the vehicle.

With reference to FIGS. 1-7, embodiments of the vehicle 100 will be described and illustrated.

An embodiment of the vehicle 100 can include a body 102 having a body bottom 304 conjoined with a body sidewall 302 and a body top 300 forming a body cavity 306, wherein the body top 300 includes a body top opening 310 and the body sidewall 302 includes a body sidewall opening 312. The body 102 is shown to be rectangular cuboidal, but the body 102 can be made into other shapes. These can be, but are not limited to, cubic, spherical, pyramidal, disc-shaped, etc. Embodiments of the vehicle 100 can be an aerial vehicle, a land vehicle, and/or a water vehicle. The shape of the vehicle 100 may depend on the intended use so as to allow the vehicle 100 to better fly in the atmosphere, traverse the terrain, or propel in or on water. The body cavity 306 can be configured to slidably receive and retain at least one operating module 202 for the vehicle 100. Thus, the body 102 can be structured as a carriage for the vehicle 100 and a frame for the operating module 202. It is contemplated for the operating module 202 to generate heat when in operation so the body 102 (e.g. the body bottom 304 and/or the body sidewall 302) can have, at least one aperture 314 or vent to facilitate heat transfer from the operating module 202 to an area outside of the body cavity 306.

In addition to the heat transfer apertures 314, any component of the vehicle 100 can include apertures formed therein to lighten the weight of the vehicle 100 without degrading structural integrity of that component. In addition, any component of the vehicle 100 can include structural formations (e.g., ridges, grooves, flutes, web-formations, etc.) to improve the structural rigidity or other mechanical property of the component.

The vehicle 100 can include a payload housing 200 having a payload bottom 406 conjoined with a payload housing sidewall 402 and a payload housing top 400 forming a payload housing cavity 408, wherein the payload housing cavity 408 is configured to hold at least one operating module 202 for the vehicle 100. The payload housing 200 can be configured to slidably insert into the body cavity 306. Thus, the payload housing 200 can have a shape that matches or complements that of the body cavity 306. For instance, the body cavity 306 can be rectangular cuboidal and the payload housing 200 can be rectangular cuboidal but of slightly smaller dimensions so as to allow the payload housing 200 to slidably insert within the body cavity 306. Other shapes for the payload housing 200 can be used. While the exemplary embodiments show the body cavity 306 having a shape that matches that of the payload housing 200, it does not have to. Instead, the body cavity 306 can have a shape and dimensions that accommodates the shape and dimensions of the payload housing 200 without matching that of the payload housing 200.

The body 102 can have a body top opening 310 to allow for the slidable insertion and removal of the payload housing 200. In addition, or in the alternative, the body sidewall 302 can also have a body sidewall opening 312 for the same. Similarly, any portion of the payload housing 200 can have an opening to facilitate insertion and removal of at least one operating module 202, sensor, processor, and/or other element of the payload (the payload being an element that is contained by the payload housing 200).

The vehicle 100 can include at least one arm 104. The arm 104 can be a structure that supports the body 102. For example, for a land vehicle 100, the arm(s) 104 can serve as a wheeled-axle to support the body 102 thereon. The arm(s) 104 can be a structure that supports the means for propulsion. In this regard, the arm(s) 104 can be used in accordance with the method of propulsion. For instance, for a water vehicle 100, the arm(s) 104 can serve as a rudder, a structural support for a propeller or thruster, etc. For an aerial vehicle 100, the arm(s) 104 can serve as a structural support for a propeller 802.

Exemplary embodiments show the vehicle 100 configured as an unmanned aerial vehicle 100 or a drone. The arm 104 is used to provide a structural support for a rotatable motor 110. The rotatable motor 110 has a spindle 114 to facilitate connection to a propeller 802. When the arm 104 is attached to the body 102, the spindle 114 extends in a longitudinal direction 116 so as to allow the propeller 802 to be normal (or substantially normal) to the longitudinal direction 116.

The arm 104 can be configured to removably attach to a portion of the body 102. In the exemplary embodiment shown in FIG. 6, the arm 104 has a triangular shape, having a first side 316, a second side 318, and a third side 320 with an open center 600. For example, the arm 104 can be in the shape of a as a right triangle with the first side 316 being the opposite side, the second side 318 being the adjacent side, and the third side 320 being the hypotenuse. The junction of the second side 318 and the third side 320 can include a mount 112. The mount 112 can be configured to receive the rotatable motor 110. The first side 316 can be structured to have an interlocking arrangement 308 that will facilitate the removable attachment of the arm 104 to the body 102.

Some embodiments can include at least one interlocking arrangement 308 on the body top opening 310 or body sidewall 302 configured to removably secure the payload housing 200 and the at least one arm 104 to the body 102. It is contemplated for the components of the vehicle 100 to be removably attachable to each other. This can be achieved via at least one interlocking arrangement 308. The interlocking arrangement 308 can be a snap-fit, interference fit, a tessellation engagement, a rail-and-guide engagement, etc.

For instance, the body 102 can have a body inner surface 322 and a body outer surface 324. The body inner surface 322 can have a guide 700 and/or rail 702 formed therein. The guide 700 and/or rail 702 can be in the longitudinal direction 116 and/or latitudinal direction 118. The payload housing 200 can have a payload housing inner surface 410 and a payload housing outer surface 412. The payload housing outer surface 412 can have a rail 702 and/or guide 700 formed therein. The rail 702 and/or guide 700 can be in the longitudinal direction 116 and/or latitudinal direction 118. Each rail 702 or guide 700 of the payload housing 200 can be configured to engage with each guide 700 or rail 702 of the body 102 to allow the payload housing 200 to be slidably inserted into the body cavity 306 of the body 102 and be secured in place. It is contemplated for the rail 702 to slide into the space of the guide 700 so as to generate a snug fit. Thus, the cross-sectional shape of the rail 702 can match or complement that of the guide 700 it is being slid into. The cross-sectional shape of the rail 702 and/or guide 700 can be square, arcuate, triangular, keystone, T-shaped, etc. The snug fit can be generated by the tight tolerance of the rail 702 and guide 700 dimensions, an interference snap connection, etc.

In addition, the body outer surface 324 can have a guide 700 and/or rail 702 formed therein. The guide 700 and/or rail 702 can be in the longitudinal direction 116 and/or latitudinal direction 118. The first side 316 of the arm 104 can have a rail 702 and/or guide 700 formed therein. The rail 702 and/or guide 700 can be in the longitudinal direction 116 and/or latitudinal direction 118. Each rail 702 or guide 700 of the arm 104 can be configured to engage with each guide 700 or rail 702 of the body 102 to allow the arm 104 to be slidably connected to the body 102 and be secured in place. It is contemplated for the rail 702 to slide into the space of the guide 700 so as to generate a snug fit. Thus, the cross-sectional shape of the rail 702 can match or complement that of the guide 700 it is being slid into. The cross-sectional shape of the rail 702 and/or guide 700 can be square, arcuate, triangular, keystone, T-shaped, etc. The snug fit can be generated by the tight tolerance of the rail 702 and guide 700 dimensions, an interference snap connection, etc.

In some embodiments, each of the body 102, the payload housing 200, and the at least one arm 104 are structured with additive manufactured material. This can be metal, metal alloy, composite material, plastic, polymer, etc. It is contemplated for any one or combination of components of the vehicle 100 to be produced using additive manufacturing. This can allow a user to fabricate a component as-needed, provided the user has access to an additive manufacturing apparatus 1714. The additive manufacturing apparatus 1714 can be an apparatus configured to deposit a binder material onto a powder bed to generate a build layer by layer via Binder Jetting or Selective Laser Sintering methods. Other additive manufacturing techniques can include Fused Deposition Modeling, Stereolithography, Digital Light Processing, Selective Laser melting, Electron Beam Melting, etc. The additive manufacturing apparatus 1714 can include a processing unit configured to operate via a build file that has the necessary instructions for generating the build. The build can be a component part of the vehicle 100.

Figure 10:
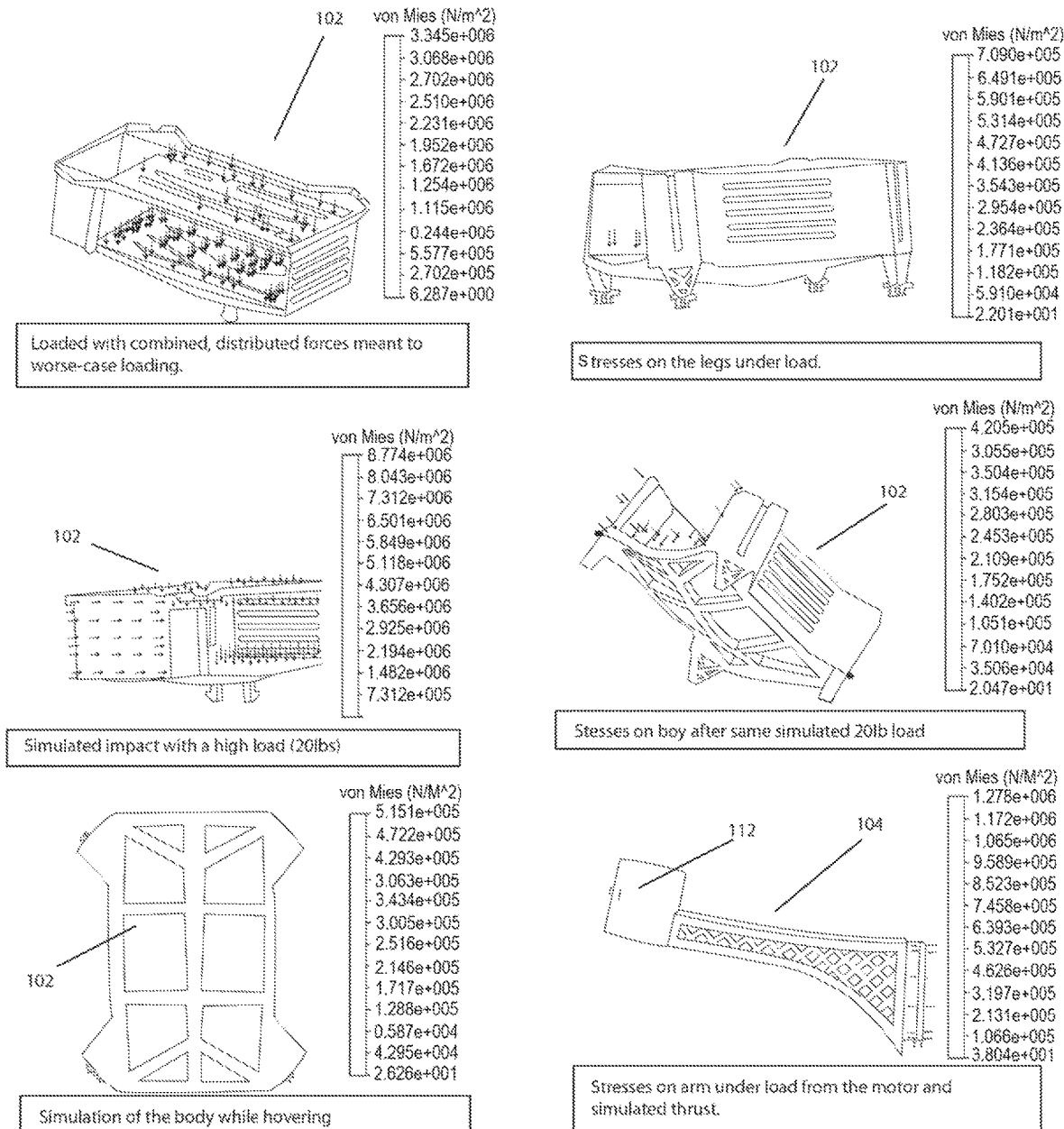
FIG. 10 shows an exemplary Finite Element Analysis used to design component parts of an embodiment of the vehicle.

The ability to: 1) fabricate a component as-needed with use of an additive manufacturing apparatus 1714; and 2) the ability to configure and re-configure the vehicle 100 on-the-fly to meet specific design criteria or perform a specific type of surveillance and reconnaissance by the modularity of the component parts is based in part on the specific design and system criteria imposed on the shapes and configurations of the component parts. In this regard, embodiments of the method of using the vehicle 100 can involve developing the build file for the additive manufacturing apparatus 1714 via Finite Element Analysis ("FEA"). (See FIG. 10). A build file can be generated for each component of the vehicle 100 and either stored on a memory of the additive manufacturing apparatus 1714 or transferred thereto. Embodiments of the method can involve use of FEA to set the parameters of the build file that will control product characteristics for the component part by generating operational parameters to control the additive manufacturing apparatus 1714 and predictively optimizing them to meet design requirements. FEA can also be used to take into account desired material and mechanical characteristics and other parameters that enable the component part to be made via additive manufacturing and to function properly during subsequent use as a surveillance and reconnaissance vehicle 100. For example, material properties, mechanical properties, use of least amount of material, structural integrity, reduction of weight, transfer of moments and force vectors, etc. can be mathematically modeled and represented by variables during the FEA. Algorithmic functions including use of these variables can then be generated and incorporated into the build file. The build file can then be operated on a processor of the additive manufacturing apparatus 1714 to develop a design for the component part.

For example, a user can input at least one variable into the additive manufacturing apparatus 1714, such as the dimensions and desired weight of the component part to be produced. The processor of the additive manufacturing apparatus 1714 can then run at least one algorithm embedded in the build file to generate at least one the operating parameter that would generate a component part exhibiting the desired characteristics. In some embodiments, the additive manufacturing apparatus 1714 can be programmed (via the build file) to generate a plurality of operating parameters as a function of another operating parameter. For example, the additive manufacturing apparatus 1714 may generate a set of operating parameters for each powdered material available to a user that would result in a component part having the dimensions, shapes, locations of interlocking arrangements, etc. that would provide the desired mechanical properties (e.g., the ability for it to be fabricated via additive manufacturing, the ability for it to include and use the interlocking arrangements for assembly and disassembly, etc.). A user may then select the powdered material (or other raw material, based on the method of additive manufacturing used) with the most desirable characteristics to be used by the additive manufacturing apparatus 1714 to make the component. The ability to make the component parts via additive manufacturing can obviate the need for a user to have to carry all of the component parts that he or she would conceivably need.

In some embodiments, each of the body 102, the payload housing 200, and the at least one arm 104 are structured entirely with additive manufactured material. Embodiments of the vehicle 100 can be configured so that each component can be produced via additive manufacturing. This can provide a user the ability to fabricate any component as-needed so that the user does not have to carry spare parts or parts that would be needed for re-configuration with him or her. Instead, the user merely fabricates the part on the spot.

The vehicle can include a cover 106 structured with additive manufactured material, wherein the at least one interlocking arrangement 308 is configured to removably secure the cover 106 to the body 102. The body outer surface 324 can have a guide 700 and/or rail 702 formed therein. The guide 700 and/or rail 702 can be in the longitudinal direction 116 and/or latitudinal direction 118. The cover 106 can have a cover outer surface 500 and a cover inner surface 502. The cover inner surface 502 can have a rail 702 and/or guide 700 formed therein. The rail 702 and/or guide 700 can be in the longitudinal direction 116 and/or latitudinal direction 118. Each rail 702 or guide 700 of the cover 106 can be configured to engage with each guide 700 or rail 702 of the body 102 to allow the cover 106 to be slidably connected to the body 102 and be secured in place. It is contemplated for the rail 702 to slide into the space of the guide 700 so as to generate a snug fit. Thus, the cross-sectional shape of the rail 702 can match or complement that of the guide 700 it is being slid into. The cross-sectional shape of the rail 702 and/or guide 700 can be square, arcuate, triangular, keystone, T-shaped, etc. The snug fit can be generated by the tight tolerance of the rail 702 and guide 700 dimensions, an interference snap connection, etc. It is contemplated for the cover 106 to be secured to the body 102 at the body top opening 310 so as to be placed over the body top opening 310. The cover 106 can be used to cover, conceal, and/or protect the contents (e.g., the payload housing 200, the operating module 202, etc.) placed within the body cavity 306.

In some embodiments, the at least one interlocking arrangement 308 is configured to be manually transitioned between an engaged configuration and a disengaged configuration. Any of the interlocking arrangements 308 described herein can be transitioned to and from an engaged configuration (e.g., the rail 702 being snugly fit within the guide 700) and a disengaged configuration (e.g., the rail 702 being removed from the guide 700). This transition can be done manually (e.g., without the use of tools or other equipment). The overall vehicle 100 structure, the shapes and configurations of the component parts, and the placement and configuration of the interlocking arrangements 308 can be specifically designed via FEA or other analytical methods to allow for this manual engagement and disengagement but to also provide a vehicle 100 that will operate and function effectively and reliably. Known vehicles cannot be assembled without the use of tools for assembly, and if their parts would be configured to be assembled without the use of tools then it would lead to a significant degradation in performance.

In some embodiments, the at least one arm 104 includes plural arms. In an exemplary embodiment, the vehicle 100 is configured as an unmanned, aerial vehicle that operates like a drone. In this regard, the vehicle 100 can include four arms 104, each arm having a propeller 802 to provide lift and thrust so that the vehicle 100 can operate as a helicopter style rotocraft. For instance, the vehicle 100 can have a first arm 104, a second arm 104, a third arm 104, and a fourth arm 104. The first arm 104 can have a triangular shape, having a first side 316, a second side 318, and a third side 320 with an open center. The junction of the second side 318 and the third side 320 can include a mount 112. The mount 112 can be configured to receive the rotatable motor 110. The first side 316 can be structured to have an interlocking arrangement 308 that will facilitate the removable attachment of the arm 104 to the body 102. The second arm 104 can have a triangular shape, having a first side 316, a second side 318, and a third side 320 with an open center. The junction of the second side 318 and the third side 320 can include a mount 112. The mount 112 can be configured to receive the rotatable motor 110. The first side 316 can be structured to have an interlocking arrangement 308 that will facilitate the removable attachment of the arm 104 to the body 102. The third arm 104 can have a triangular shape, having a first side 316, a second side 318, and a third side 320 with an open center. The junction of the second side 318 and the third side 320 can include a mount 112. The mount 112 can be configured to receive the rotatable motor 110. The first side 316 can be structured to have an interlocking arrangement 308 that will facilitate the removable attachment of the arm 104 to the body 102. The fourth arm 104 can have a triangular shape, having a first side 316, a second side 318, and a third side 320 with an open center. The junction of the second side 318 and the third side 320 can include a mount 112. The mount 112 can be configured to receive the rotatable motor 110. The first side 316 can be structured to have an interlocking arrangement 308 that will facilitate the removable attachment of the arm 104 to the body 102. Each arm 104 can be connected to the body 102 via interlocking arrangements 308 located at or near the corners 120 of a rectangular cuboidal shaped body 102. For instance, the first arm 104 can be connected to a first corner 120 via a first interlocking arrangement 308, the second arm 104 can be connected to a second corner 120 via a second interlocking arrangement 308, the third arm 104 can be connected to a third corner 120 via a third interlocking arrangement 308, and the fourth arm 104 can be connected to a fourth corner 120 via a fourth interlocking arrangement 308.

In some embodiments, the at least one arm 104 includes a failure point configured to facilitate mechanical failure of the at least one arm 104 upon experiencing a threshold force vector before transferring the threshold force vector to another component of the vehicle 100. For instance, when the arm 104 is connected to the body 102, the arm 104 can be configured to fail when a threshold force vector is applied to the arm 104 before the arm 104 transfers the threshold force vector to the body 102.

In some embodiments, the at least one arm 104 includes a motor 110 configured to propel the vehicle 100. As noted herein, the arm 104 can include a mount 112 configured to receive the motor 110. The motor 110 can be an electric rotable motor with a spindle 114 extending therefrom to facilitate connection of a propeller 802 thereto. An exemplary motor 110 can be an AX-2810Q-750 KV Brushless Quadcopter Motor, but other motors can be used. The connection of the propeller 802 to the spindle 114 can be via an interlocking arrangement 308. The motor 110 can be configured to be secured to the mount 112 via a thumb-screw engagement. The motor 110 can include a gimbal assembly to allow for adjustment of pitch, roll, and/or yaw of the propeller 802 and/or the vehicle 100 itself.

In some embodiments, the at least one arm 104 includes an electrical connector conduit 108 configured to route an electrical connector 800 from the motor 110 to facilitate electrical communication between the motor 110 and the at least one operating module 202. For instance, the second side 318 can include a channel or duct running along at least a portion of the second side 318 as the conduit 108 to allow routing an electrical connector 800. The electrical connector 800 can be electrical wiring, terminals, adapters, plugs, sockets, etc. that can facilitate electrical communication between the motor 110 and the operating module 202 or an element of the operating module 202. For instance, the first arm 104 can include an electrical connector conduit 108 along its second side 318 to facilitate routing an electrical connector 800 from the motor 110 of the first arm 104 to the operating module 202, the second arm 104 can include an electrical connector conduit 108 along its second side 318 to facilitate routing an electrical connector 800 from the motor 110 of the second arm 104 to the operating module 202, the third arm 104 can include an electrical connector conduit 108 along its second side 318 to facilitate routing an electrical connector 800 from the motor 110 of the third arm 104 to the operating module 202, and the fourth arm 104 can include an electrical connector conduit 108 along its second side 318 to facilitate routing an electrical connector 800 from the motor 110 of the fourth arm 104 to the operating module 202.

Figure 8:
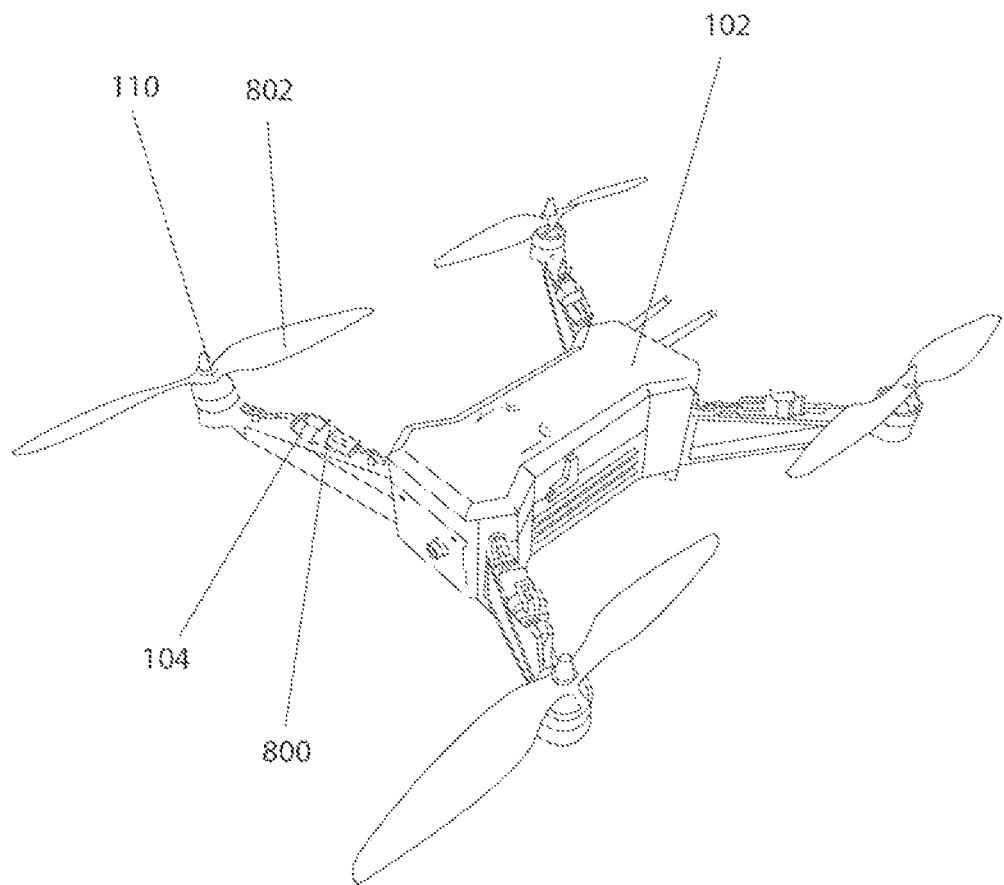
FIG. 8 shows an embodiment of the vehicle configured as an aerial vehicle.
Figure 9:
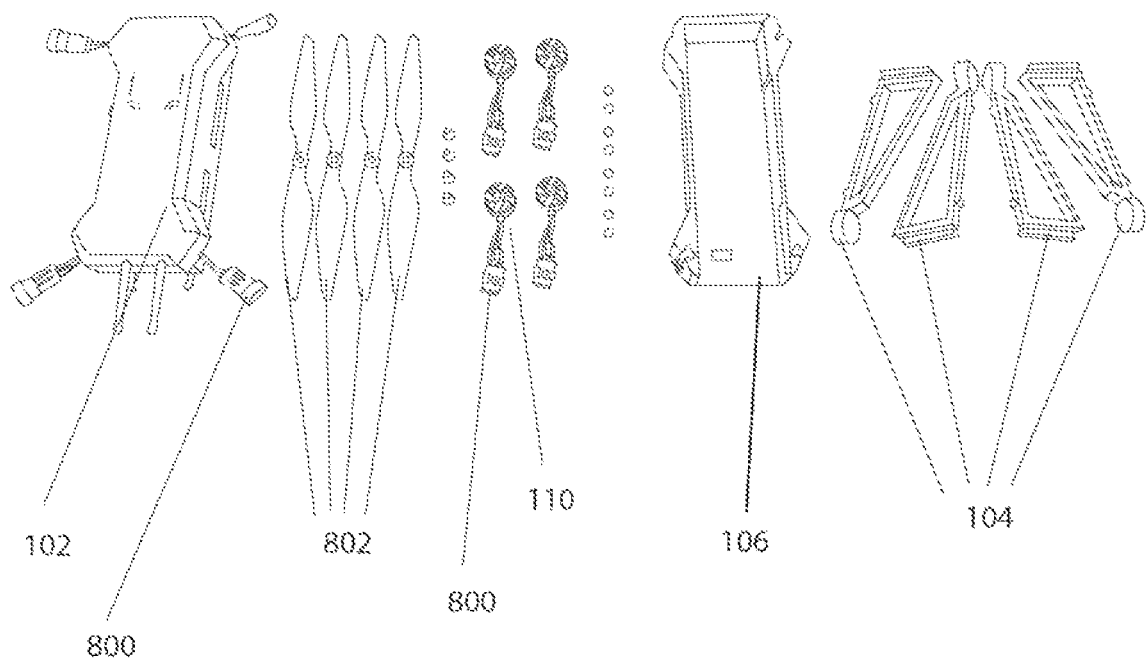
FIG. 9 shows exemplary component parts of an embodiment of the vehicle configured as an aerial vehicle.

Referring to FIGS. 8-9, the vehicle 100 can be configured to be an aerial vehicle, a land vehicle, and/or a water vehicle. In this regard, the method of propulsion can be tailored to accommodate the type of vehicle 100. For instance, the motor(s) 110 for the aerial vehicle may be configured to drive the propellers 802, the motor(s) 110 for a land vehicle may be configured to drive the wheel(s), the motor(s) 110 for the water vehicle may be configured to drive the propellers or thrusters, etc. The shape and dimensions of the component parts, the type and location of the interlocking arrangements 308, the selection of the materials used for fabrication, etc. can be designed via finite element analyses or other analytics disclosed herein to meet the design criteria that will enable the vehicle 100 to operate as an aerial, land, or water vehicle while still meeting the criterial of: 1) having modular components; 2) being assembled and disassembled without the use of tools; and 3) having each component being able to be fabricated via additive manufacturing.

The vehicle 100 can be configured to be an autonomous vehicle. Embodiments of the vehicle 100 can be configured to operate autonomously, but can also be configured to operate manually (e.g., via remote control) and/or semi-autonomously. This can be achieved via the use of any one or combination of a navigation module 1102, a surveillance module 1100, and a telemetry module 1104 as part of the operating module 202.

Figure 11:
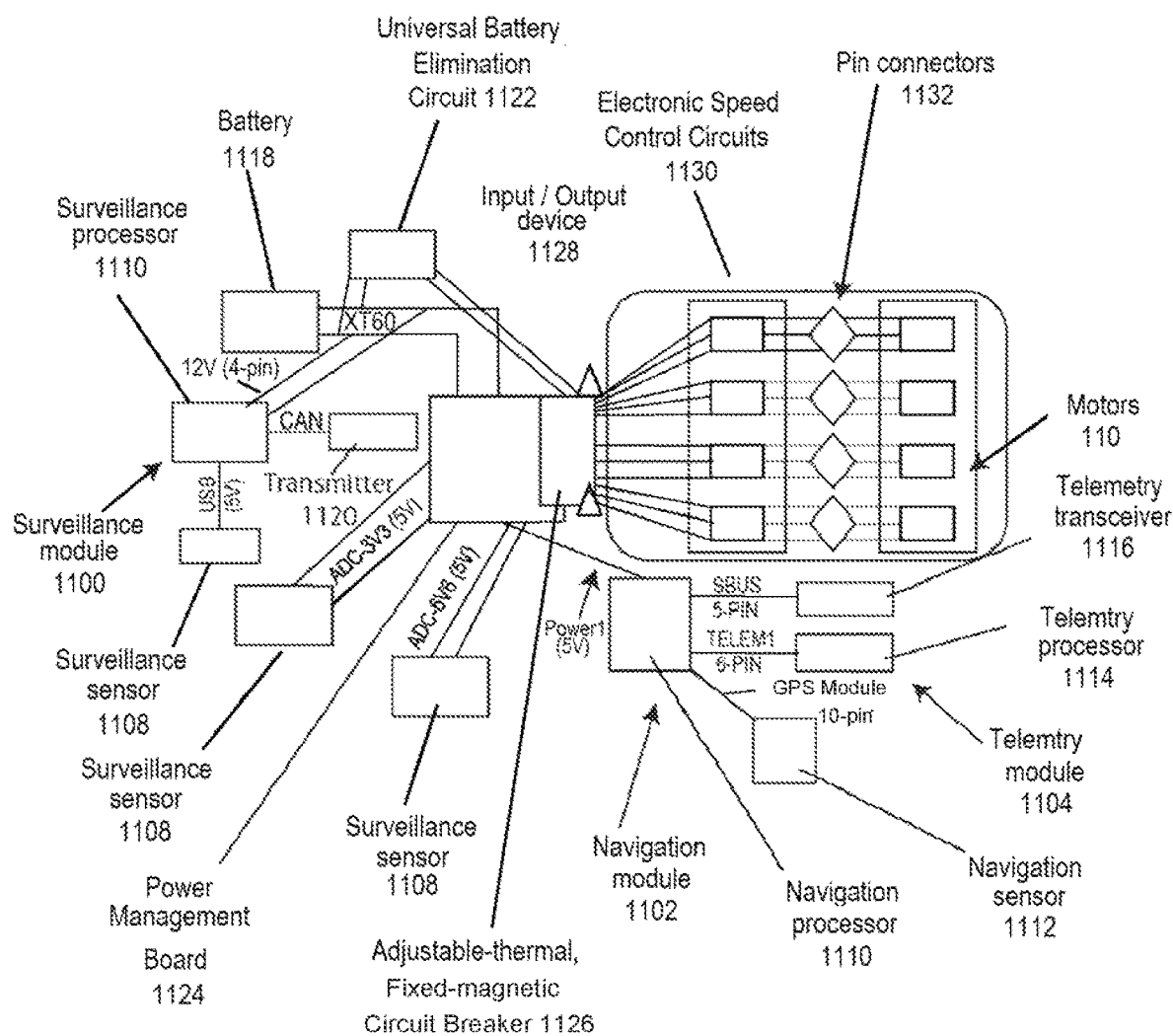
FIG. 11 shows an exemplary system schematic for an embodiment of the vehicle.
Figure 12:
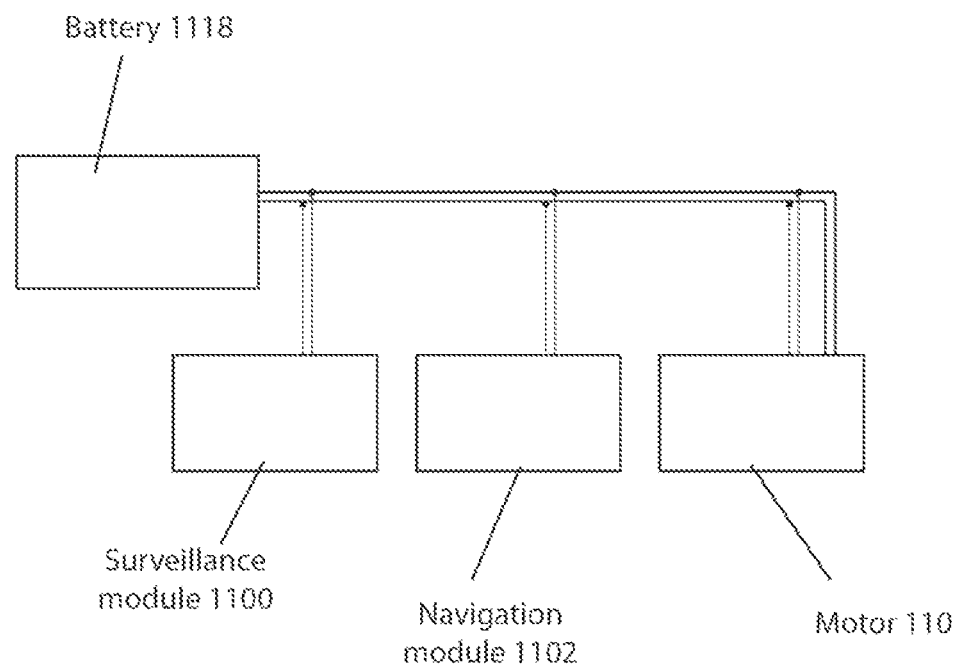
FIG. 12 shows an exemplary wiring diagram for an embodiment of the vehicle.
Figure 13:
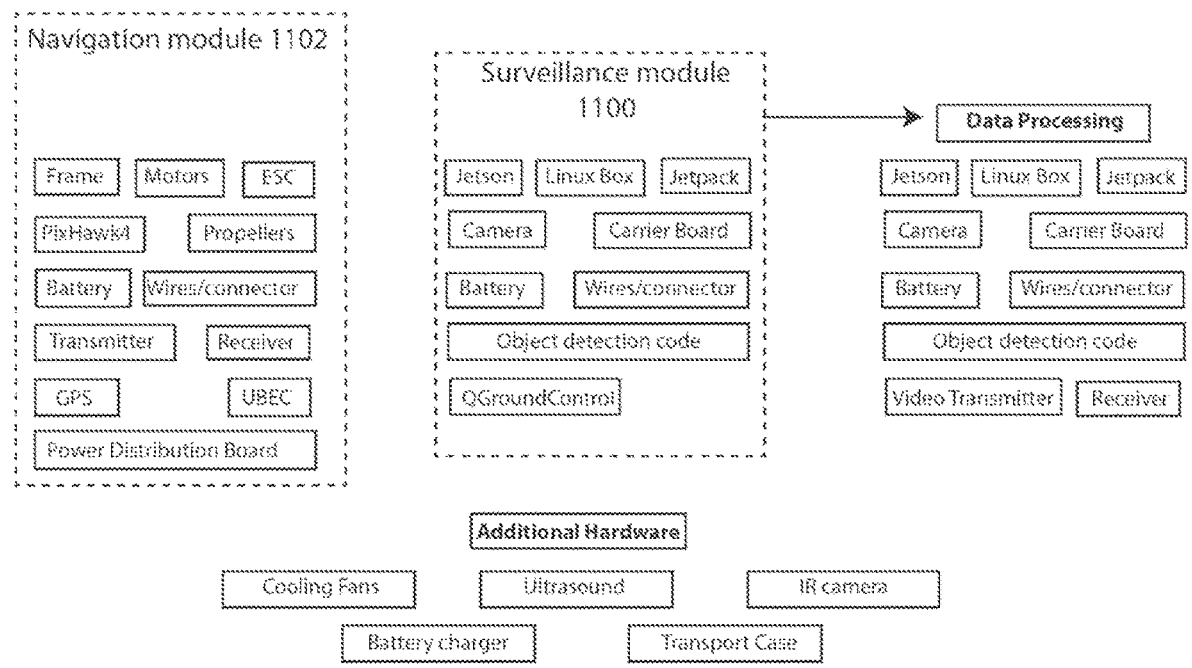
FIG. 13 shows exemplary module architectures for an embodiment of the vehicle.
Figure 14:
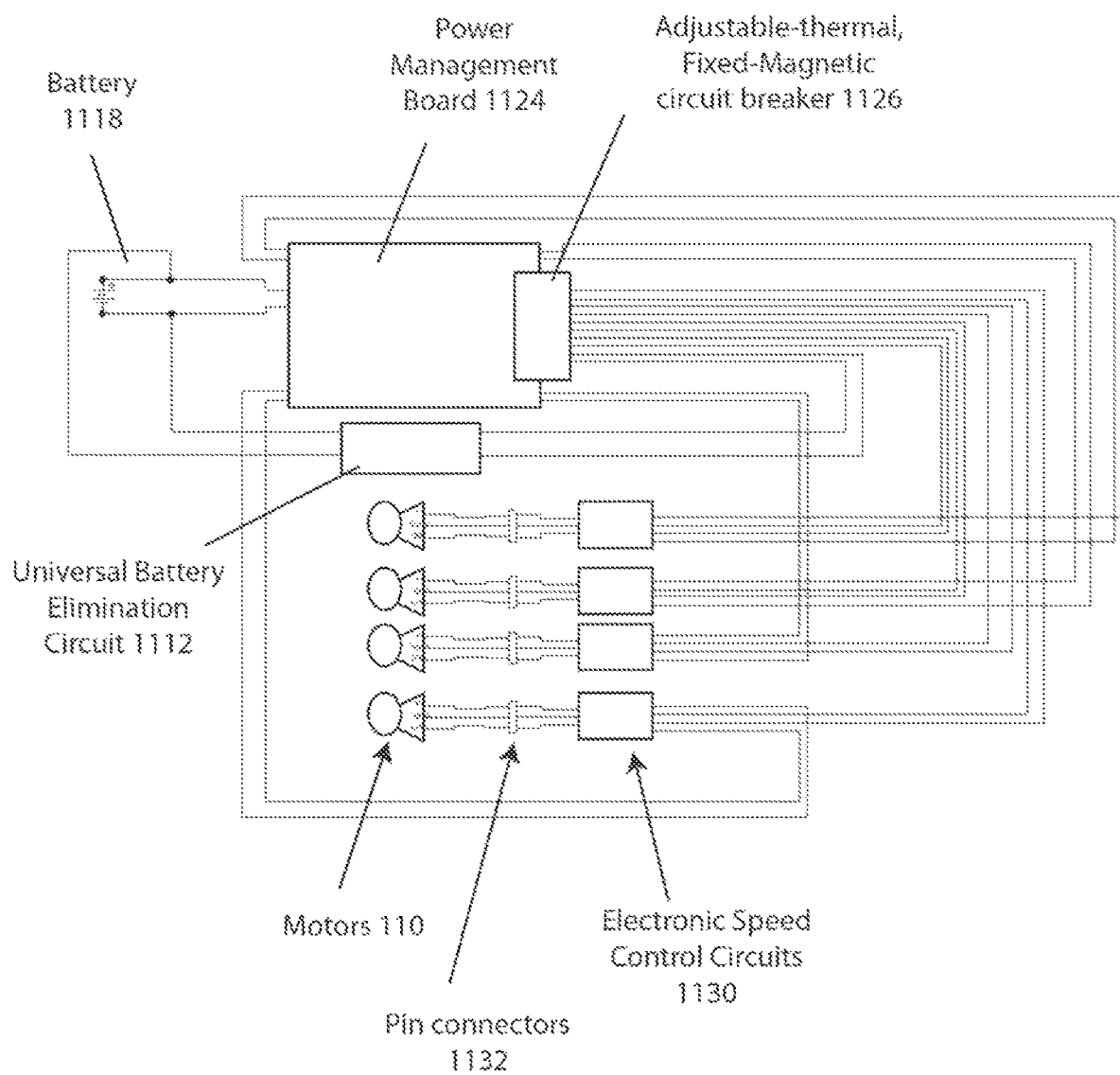
FIG. 14 shows an exemplary motor connections set-up for an embodiment of the vehicle.
Figure 15:
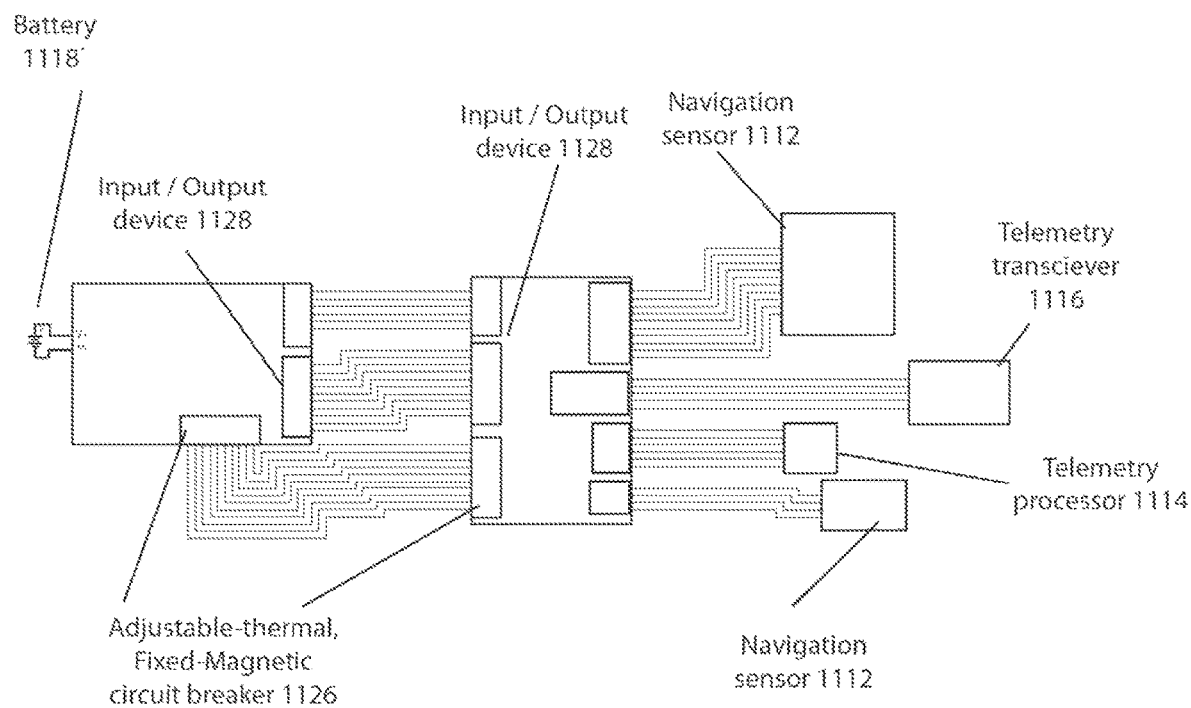
FIG. 15 shows exemplary navigation or avionics module wiring for an embodiment of the vehicle.
Figure 16:
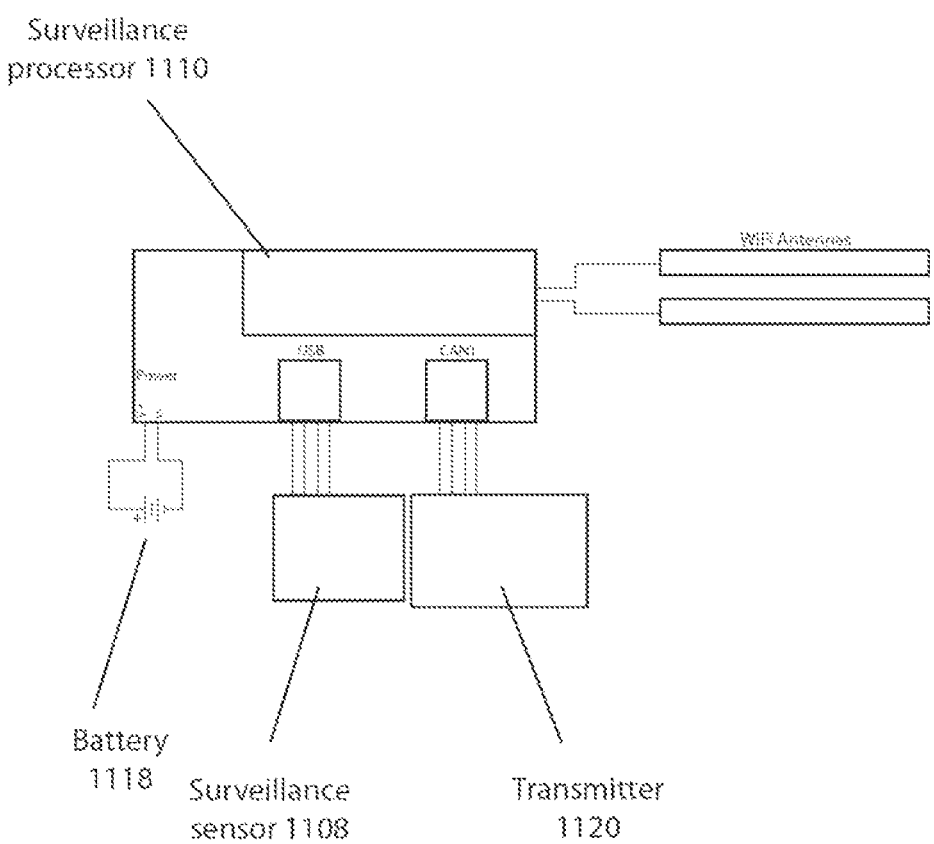
FIG. 16 shows exemplary surveillance module wiring for an embodiment of the vehicle.

Referring to FIG. 11, in some embodiments, the at least one operating module 202 includes a navigation module 1102, a surveillance module 1100, and/or a telemetry module 1104. Other types of operating modules 202 can be used. These can include, but are not limited to a delivery module, a mapping module, a scanning module, a tracking module, a storm-chasing module, photography module, wi-fi hotspot module, telemetry booster module, an advertising module, etc. The navigation module 1102 can include a navigation processor 1110 and a navigation sensor 1112. The navigation module 1102 can be configured to communicate with at least one motor 110 of the vehicle 100 to facilitate navigation and propulsion of the vehicle 100. The surveillance module 1100 can include a surveillance processor 1106 and a surveillance sensor 1108. The surveillance module 1100 can be configured to receive raw data 1700 and generate distilled data 1702. The telemetry module 1104 can include a telemetry processor 1114 and a telemetry transceiver 1116. The telemetry module 1104 can be configured to transmit the distilled data 1702 to a computer device 1712.

Any of the processors disclosed herein can be at least a one of a scalable processor, parallelizable processor, and optimized for multi-thread processing capabilities. In some embodiments, the processor can be a graphics processing unit (GPU). The processor can include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Various functional aspects of the processor may be implemented solely as software or firmware associated with the processor Any of the processors disclosed herein can be optionally associated with a memory. Embodiments of the memory can include a volatile memory store (such as RAM), non-volatile memory store (such as ROM, flash memory, etc.) or some combination of the two. For instance, the memory can include, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the processor. According to exemplary embodiments, the memory can be a non-transitory computer-readable medium. The term "computer-readable medium" (or "machine-readable medium") as used herein is an extensible term that refers to any medium or any memory, that participates in providing instructions to the processor for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission media.

Transmission media includes coaxial cables, copper wire and fiber optics, including the wires that include or form a bus. Transmission media can also take the form of acoustic or light waves, such as those generated during radio-wave and infrared data communications, or other form of propagated signals (e.g., carrier waves, infrared signals, digital signals, etc.). Forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Instructions for implementation of any of the methods disclosed herein can be stored on the memory in the form of computer program code. The computer program code can include program logic, control logic, or other algorithms that may or may not be based on artificial intelligence (e.g., machine learning techniques, artificial neural network techniques, etc.).

The navigation module 1102 can be an avionics module. For instance, the navigation module 1102 can include a navigation processor 1110 and a navigation sensor 1112 that will allow the operating module 202 to autonomously or semi-autonomously control the motors 110 (and thus the propellers 802) of the vehicle 100 to allow the vehicle 100 take-off, fly, navigate through an aerial space, and land. This can include controlling the lift, thrust, pitch, roll, and/or yaw vehicle 100.

A method of using a vehicle 100 can involve manually assembling a payload housing 200 and at least one arm 104 to a body 102 via at least interlocking arrangement 308 used to secure the payload housing 200 to the body 102 and the at least one arm 104 to the body 102. For instance, the payload housing 200 can be inserted within the body cavity 306 and secured in place via at least one interlocking arrangement 308. The payload housing 200 can have at least one operating module 202 secured within the payload housing cavity 408. The first, second, third, and fourth arms 104 can be attached to the body 102 via additional interlocking arrangements 308.

The method of using a vehicle 100 can involve manually attaching at least one motor 110 to the at least one arm 104. For instance, a first motor 110 can be secured to the first mount 112 of the first arm 104 via a thumb-screw engagement, a second motor 110 can be secured to the second mount 112 of the second arm 104 via a thumb-screw engagement, a third motor 110 can be secured to the third mount 112 of the third arm 104 via a thumb-screw engagement, and a fourth motor 110 can be secured to the fourth mount 112 of the fourth arm 104 via a thumb-screw engagement. An individual propeller 802 can be secured to each individual motor 110 (e.g., the vehicle XX can have four propellers 802 for the four motors 110). An electrical connector 800 for each arm 104 can be routed from the motor 110 of that arm 104 via the electrical connector conduit 108 to facilitate electrical communication between the motor 110 and the at least one operating module 202.

In some embodiments, the method of using the vehicle 100 can involve fabricating the body 102, the payload housing 200, and the at least one arm 104 via additive manufacturing. This can involve fabricating the body 102, the payload housing 200, and the at least one arm 104 using the additive manufacturing apparatus 1714.

In some embodiments, the method of using a vehicle 100 can involve receiving raw data 1700 including real time video stream information about an environment 1718, and generating distilled data 1702 including still image information from the real time video stream information, the still image information including at least one object 1716 identified via an object classification and localization technique. Embodiments of the surveillance module 1100 can include a surveillance sensor 1108. The surveillance sensor 1108 can be a camera (e.g., optical camera, digital camera, infrared camera, or other camera operating in another spectrum, etc.). The camera can be configured to record real time video stream information about the environment 1718. Embodiments of the surveillance module 1100 can include a surveillance processor 1106. The surveillance sensor 1108 can include other sensors, such as light detection and ranging sensors, sound sensors, Global Positioning System (GPS) antenna, optical flow sensors configured to track movement of objects, chemical sensors, biological sensors, radiological sensors, nuclear sensors, ultraviolet light sensors, particulate matter sensors, emissions sensors, etc. The surveillance processor 1106 can be configured to receive and process the real time video stream information and generate still image information therefrom. The still image information can be a portion or segment of the real time video stream, a compilation of plural portions or segments of the real time video stream, etc. For instance, the still image information can be an image or a file that is representative of the environment 1718 or a portion of the environment 1718 in a form that can be displayed, printed out (e.g., a virtual printout forming a file of the image), or processed further. The still image information can include additional information about the environment 1718, such as identification of at least one object 1716 in the environment 1718 for example. This can be achieved by the surveillance processor 1106 executing an object classification and localization technique. The additional information can be superimposed on the image of the environment 1718 and/or displayed in juxtaposition with the image of the environment 1718.

In some embodiments, the raw data 1700 can include location data (e.g., data received by a GPS when available). It may also include other data across the electromagnetic spectrum, which may include but is not limited to infrared, radio, laser reflection for object targeting/range/position, data from optical flow sensors to detect movement over a reference surface (ground, rooftops, etc.), chemical/biological sensors, and/or other environmental data depending on the payload selected. In some embodiments, the distilled data 1702 can include position (longitude, latitude, and altitude of object 1716) and can be presented in Military Grid Reference System MGRS coordinates, or presented via other positioning systems (e.g., WGS 84 global reference system, NAD 83 geodetic datum network, etc.) to report position on and/or over the ground. The distilled data 1702 can also include thermal signature information, time reference information, apparent motion of an object 1716 of interest, chemical/biological or other environmental and particulate information, etc.

It is contemplated for the surveillance processor 1106 to use at least one object classification and localization technique to identify objects 1716 within the environment 1718. The identification of the objects 1716 can be based on the type of surveillance and reconnaissance and the AOO or an AOI. For instance, if the vehicle 100 is being used for military surveillance and reconnaissance, the object classification and localization technique can be used to identify places in which enemy personnel can hide (e.g., sniper nest, bunker, fighting position, vehicles located on a street, etc.). As another example, if the vehicle 100 is being used for a security detail, the object classification and localization technique can be used to identify potential threats, such as vehicles on a street, tanks, aircraft, defilades, etc. As another example, if the vehicle 100 is being used for police surveillance and reconnaissance, the object classification and localization technique can be used to identify personnel (criminal or hostage) in windows, behind walls, etc.

The object classification portion of the object classification and localization technique can be based on computer program code having program logic, control logic, or other algorithms that may or may not be based on artificial intelligence (e.g., machine learning techniques, artificial neural network techniques, etc.). For example, the surveillance processor 1106 can be associated with a memory that stores computer program code having a library of objects from which the surveillance processor 1106 uses as a comparison to identify an object 1716 in the raw data 1700. For instance, the memory can have plural images of vehicles stored from which an object 1716 in the raw data 1700 is compared with to determine that the object 1716 is a vehicle. The plural images of vehicles can be from various angles (e.g., top view, side view, perspective view, etc.), can be of different styles of vehicles, can be of different colors of vehicles, etc. The real time video stream information can be split into images by separating the frames at certain intervals. Once a frame is isolated and separated, the computer program code can perform object detection and classification by causing the surveillance processor 1106 to compare the object 1716 from the raw data 1700 to the plural vehicles so that a statistic that represents the probability that the object 1716 is a vehicle can be generated. This statistic can be in the form of a confidence score 1800. The computer program code can cause the surveillance processor 1106 to positively identify the object 1716 as a vehicle based on a threshold value of the confidence score 1800 (e.g., the surveillance processor 1106 identifies an object 1716 as a vehicle if the comparison generated a match with a confidence score 1800 greater than the threshold value).

Use of a vehicle for object identification is for exemplary purposes only, as other objects 1716 can be identified, such as persons, animals, buildings, streets, weapons, etc. In addition, other object recognition techniques, object size and shape recognition techniques, signal processing and filtration techniques (e.g., as Fourier transforms, Gabor transforms, etc.), mathematical modeling techniques, etc. can be used to identify and track objects 1716, or a portion of an object 1716.

The surveillance processor 1106 can be configured to identify all of the objects 1716 in the AOO or AOI, or it can be configured to identify certain objects 1716 of interest. For instance, embodiments of the object classification and localization technique can be used to identify all of the vehicles on a certain street. In some embodiments, the object classification and localization technique can omit or remove at least some of the other objects 1716 (objects other than the ones identified as vehicles) from the distilled data 1702 so that the still image information is a filtered image of the AOO or AOI.

In some embodiments, the object classification and localization technique can be configured so that the identified object 1716 is included in the distilled data 1702 only if it has not already been identified earlier, or previously identified earlier within a predetermined time frame. For example, if the real time video stream information is captured at 30 frames per second, it may be undesirable to have 120 images of the same object 1716 over a 4 second period. Thus, a frame/time buffer can be implemented to limit duplicative displays of the same object 1716. For instance, the raw data 1700 can include several images from several frames of the same object 1716 but at different angles, but the frame/time buffer can be used to prevent duplicative displays of the same object 1716 that has been captured in this way. In an exemplary implementation, the surveillance sensor 1108 can capture real time video stream information about objects 1716 in the environment 1718. The surveillance processor 1106 can run the real time video stream information through the frame/time buffer to allow the algorithm of the object classification and localization technique to examine each frame for object identification and localization. If an object 1716 is identified (e.g., is matched in accordance with a threshold confidence score with learned objects) an image of the object 1716 can be saved for inclusion in the distilled data 1702, which can be later transmitted by the telemetry module 1104.

Another aspect of the object classification and localization technique is the localization of objects 1716. The localization of objects can involve determining and associating coordinates to identified objects 1716. For instance, the surveillance processor 1106 can determine the objects' coordinates (e.g., longitude, latitude, altitude, grid coordinates, etc.) and associate (or co-register) a set of coordinates for each identified object 1716. The coordinates for an object 1716 can be determined via use of a GPS on-board the vehicle 100, use of a reference grid map, use of optical parallax, etc. For instance, as a non-limiting, exemplary example, a GPS can be used to track the time and location of the vehicle 100, an optical parallax system can be used to determine the location of objects 1716 relative to the vehicle 100, and these locations can be compared to a reference grid of a map of the AOO or AOI to generate a set of coordinates for each identified object 1716. Additional optical systems, such as range finders for example, can be used. In some embodiments, the coordinates for each identified object 1716 can be included with the distilled data 1702.

In some embodiments, the method of using a vehicle 100 can involve receiving the raw data 1700 at a first data bandwidth 1706, and transmitting the distilled data 1702 at a second data bandwidth 1708, the second data bandwidth 1708 being less than the first data bandwidth 1706. Some embodiments, can involve the vehicle 100 transmitting the distilled data 1702 to a computer device 1712 for further analysis or further or review or further analysis or further processing. It is contemplated for the data bandwidth requirements to transmit the distilled data 1702 to be low so as to obviate the need to establish a fast connection between the vehicle 100 and the computer device 1712 via the communications network 1710 that would otherwise be needed if the computations were performed by the computer device 1712. For instance, the surveillance processor 1106 can be configured to perform the heavy computations and data analytics for collecting the raw data 1700 and transforming it to the distilled data 1702 before the distilled data 1702 is transmitted to the computer device 1712. While the raw data 1700 is received by the surveillance processor 1106, only the distilled data 1702 is transmitted to the computer device 1712 for additional processing and storage. This allows the majority of the data to be processed on-site (e.g., in the vehicle 100) via the algorithms programmed into the surveillance processor 1106. In addition to lowering the data bandwidth requirements of the second data bandwidth 1708, having the processing done at the surveillance processor 1106 ensures that the distilled data 1702 is generated, regardless of the operability of the communications network 1710 (e.g., regardless of having an internet connection or a fast internet connection). Thus, it is possible for the vehicle 100 to be navigated back to the user without having to transmit the data to a computation device that would otherwise be necessary to convert the data to distilled data 1702. Once a user has the vehicle 100, the distilled data 1702 can be retrieved. Therefore, while it is contemplated for the vehicle 100 to transmit the distilled data 1702 to a computer device 1712 during the surveillance and reconnaissance, the vehicle 100 can be optionally operated to not transmit the distilled data 1702 to the computer device 1712 during the surveillance and reconnaissance. Moreover, the on-board processing of the surveillance processor 1106 can facilitate configuring compatibilities of the vehicle's software with that of any computer device 1712. In addition, allowing the surveillance processor 1106 to perform the heavy computations and data analytics can result in the system operating quicker, using less computational resources, and obviate the need for an analyst to analyze the raw data 1700 and generate a report that would include the distilled data 1702 (i.e., the images of the objects 1716 of interest can be generated in the distilled data 1702 without the need for any user inputs).

In some embodiments, the method of using a vehicle can involve the first data bandwidth 1706 being >1 Mbps, and the second data bandwidth 1708 being <1 Mbps As noted herein, the data bandwidth requirement for the first data bandwidth 1706 can be large to accommodate large data inputs and processing (e.g., real time video stream information about the environment 1718). For instance, the first data bandwidth 1706 can be >1 Mbps. The data bandwidth requirement for the second data bandwidth 1708 can be small to accommodate small data inputs and processing. For instance, the second data bandwidth 1708 can be <1 Mbps.

In some embodiments the payload housing 200 includes plural payload housings having a first payload housing 200 and a second payload housing 200, wherein the method of using the vehicle 100 involves manually securing the first payload housing 200 via the at least one interlocking arrangement 308, manually removing the first payload housing 200 to disengage the at least one interlocking arrangement 308, and manually securing the second payload housing 200 via the at least one interlocking arrangement 308. As noted herein, components of the vehicle 100 can be removed, replaced, and/or interchanged easily and quickly via the interlocking arrangements 308. This provides for a system with modular components that can be assembled and dis-assembled for re-configuration in a simple and efficient manner. This can be done to configure and re-configure the vehicle 100 to meet different operational criteria, thereby allowing a user to adjust the functionality of the vehicle's 100 surveillance based on the mission criteria, which can improve the versatility of the vehicle 100.

In some embodiments, the method of using the vehicle 100 can involve receiving first raw data 1700, manually removing a first payload housing 200 to disengage the at least one interlocking arrangement 308, manually securing a second payload housing 200 via the at least one interlocking arrangement 308, and receiving second raw data 1700, wherein the first raw data 1700 is different from the second raw data 1700. The first payload housing 200 can include a first surveillance sensor 1108 configured to receive first raw data 1700 in the form of geological survey information, whereas the second payload housing 200 can include a second surveillance sensor 1108 configured to receive second raw data 1700 in the form of identifying hostiles in an area. This demonstrates the versatility of the system.

In some embodiments, the method of using the vehicle 100 can involve receiving raw data 1700 and transmitting first distilled data 1702, manually removing a first payload housing 200 to disengage the at least one interlocking arrangement 308, manually securing a second payload housing 200 via the at least one interlocking arrangement 308, and receiving raw data 1700 and transmitting second distilled data 1702, wherein the first distilled data 1702 is different from the second distilled data 1700. The first payload housing 200 can include a first surveillance processor 1106 configured to receive raw data 1700 about an environment 1718 and generate first raw data 1700 that identifies places in which enemy personnel can hide, whereas the second payload housing 200 can include a second surveillance processor 1106 configured to receive the same raw data 1700 about an environment 1718 and generate second distilled data that identifies potential threats (e.g., certain types of vehicles). This again demonstrates the versatility of the system.

Referring to FIGS. 11-16, an operating module 202 for a vehicle 100 can include a navigation module 1102 including a navigation processor 1110 and a navigation sensor 1112 (or at least one navigation sensor 1112), the navigation module 1102 configured to communicate with a motor 110 (or at least one motor 110) of the vehicle 100 to facilitate navigation and propulsion of the vehicle 100. The navigation module 1102 can be an avionics module for auto-piloting or semi-auto-piloting the vehicle 100 (e.g., it can include flight control logic to fly, stabilize, and navigate the vehicle). As a non-limiting, exemplary embodiment, the navigation module 1102 can be a Pixhawk 4, with a 32-bit ARM cortex M4 core with FPU navigation processor 1110 and at least one navigation sensor 1112 (e.g., MPU6000 accelerometer and gyroscope, a ST Micro 16-bit gyroscope, a ST Micro 14-bit accelerometer/compass magnetometer, a EAS barometer, etc.). Additional navigation sensors 1112 can be includes gyroscopes, accelerometers, barometric pressure sensors as required for inertial navigation inputs for a control system, etc. Other types of the navigation modules 1102 can be used.

The operating module 202 can include a surveillance module 1100 including a surveillance processor 1106 and a surveillance sensor 1108 (or at least one surveillance sensor 1108), the surveillance module 1100 configured to: receive raw data, the raw data 1700 including real time video stream information about an environment 1718; and generate distilled data 1702, the distilled data 1702 including still image information from the real time video stream information, the still image information including at least one object identified via an object classification and localization technique. As a non-limiting, exemplary embodiment, the surveillance module 1100 can be a Jetson/J120, with a Jetson TX2 surveillance processor 1106 with a surveillance sensor 1108 (e.g., stereo camera, GPS, etc.). Other types of the surveillance modules 1100 can be used.

The operating module 202 can include a telemetry module 1104 including a telemetry processor 1114 and a telemetry transceiver 1116, the telemetry module 1104 configured to transmit the distilled data 1702 to a computer device 1712. As a non-limiting, exemplary embodiment, the telemetry module 1104 can be a 433 MHz PixHawk Ardupilot telemetry kit. Other types of the telemetry modules 1104 can be used. It is contemplated for the telemetry transmissions to be encrypted and transmitted via secure EM spectrum communication methods so as to provide a burst of distilled data 1702 (e.g., a final intelligence product) to the computer device 1712.

As noted above, the distilled data 1702 can include coordinates for objects 1716, thermal signature information, time, apparent motion of an object of interest, chemical/biological or other environmental and particulate information, etc. Any of these data can be combined with the telemetry data.

In some embodiments, the navigation module 1102 includes a GPS sensor. While the navigation module 1102 can include a GPS sensor, embodiments of the vehicle 100 can be configured to operate in a GPS denied/degraded environment. This can be achieved via sensor fusion and other artificial intelligence techniques to allow the navigation module 1102 to navigate the vehicle 100 without the GPS. For instance, the navigation module 1102 can include inertial sensors, optical flow sensors, range finders (e.g., laser or LIDAR), infrared cameras, sound or ultrasonic sensors, etc. The data from these sensors can be processed by the navigation processor 1110 to make statistical inferences about location, speed, velocity vectors, altitude, etc., which can then be used for navigation.

In some embodiments, the surveillance module 1100 includes a Graphics Processing Unit (GPU) as the surveillance processor 1106. The GPU can be configured to rapidly manipulate and alter memory to accelerate the creation of images in a frame buffer before generating the output.

In some embodiments, the telemetry module 1104 includes a gateway transceiver.

FIG. 11 shows an exemplary system schematic for an embodiment of the vehicle 100. The vehicle 100 system can include a power management board (PMB) 1124, which may include an adjustable-thermal fixed-magnetic circuit breaker (FMU) 1126. The PMB 1124 can be in connection with a battery 1118 (e.g., 14.8 V battery) and a universal battery elimination circuit (UBEC) 1122. The surveillance module 1100 can be in connection with the PMB 1124 and the battery 1118 and/or UBEC 1122. The surveillance module 1100 can be equipped with a transmitter 1120 and at least one surveillance sensor 1108 (e.g., a visible spectrum camera, an infrared camera, a sound sensor, etc.). Any one or combination of the surveillance sensors 1108 can be connected to the surveillance processor 1106 or the PMB 1124. The navigation module 1102 can include a navigation processor 1110 in connection with the PMB. The navigation module 1102 can have a navigation sensor 1112 connected to the navigation processor 1110. The telemetry module 1104 can include a telemetry processor 1114 in connection with the navigation processor 1110. The telemetry module 1104 can have a transceiver 1116 in connection with the telemetry processor 1114 and/or the navigation processor 1110. The FMU 1126 can include at least one input/output (I/O) device 1128. Each I/O device 1128 can provide electrical communication between the PMB 1124 an electronic speed control circuit (ESCC) 1130. Each individual ESCC 1130 can be connected to an individual motor 110 via an individual pin connector 1132.

Figure 17:
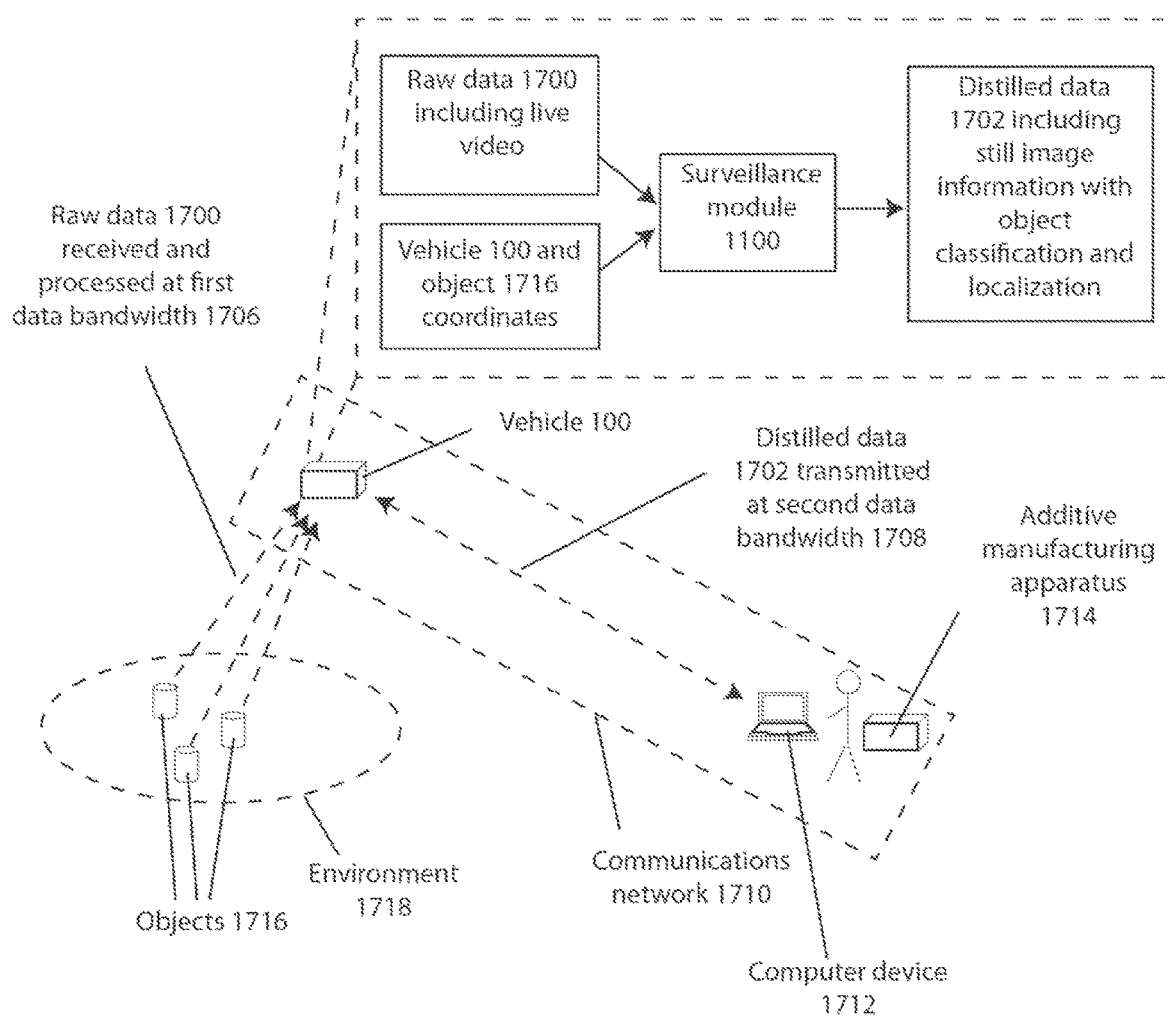
FIG. 17 shows an exemplary communications system architecture that can be used for an embodiment of the vehicle.

Referring to FIG. 17, some embodiments can include a communications network 1710 configured to facilitate communication between the telemetry module 1104 and the computer device 1712, wherein: the surveillance module 1100 is configured to receive the raw data 1700 at a first data bandwidth 1706; and the telemetry module 1104 is configured to transmit the distilled data 1702 at a second data bandwidth 1708. In some embodiments, the vehicle 100 can be part of or in connection with a communications network 1710. For example, the telemetry module 1104 can include switches, transmitters, transceivers, routers, gateways, etc. to facilitate communications via a communication protocol that facilitates controlled and coordinated signal transmission and processing. The communication links can be established by communication protocols that allow vehicle 100 to form a communication interface. The communication interface can be configured to allow the vehicle 100 (e.g., the telemetry module 1104) and another device (e.g., the computer device 1712) to form a communications network 1710. The communications network 1710 can be configured as a long range wired or a wireless network, such as an Ethernet, telephone, Wi-Fi, Bluetooth, wireless protocol, cellular, satellite network, cloud computing network, etc. Embodiments of the communications network 1710 can be configured as a predetermined network topology. This can include a mesh network topology, a point-to-point network topology, a ring (or peer-to-peer) network topology, a star (point-to-multiple) network topology, or any combination thereof.

In some embodiments, the computer device 1712 can be configured to communicate with a control processor (e.g., chip, expansion card, microcontroller, PID controller, etc.) associated with a module 202, 1100, 1102, 1104 of the vehicle 100 and to facilitate data transmissions between the computer device 1712 and at least one module 202, 1100, 1102, 1104, of the vehicle 100. In addition, any of the components of the vehicle 100 can have an application programming interface (API) and/or other interface configured to facilitate the computer device 1712 that is in communication with the vehicle 100 executing commands and controlling aspects of the vehicle 100. Embodiments of the computer device 1712 can be programmed to generate a user interface configured to facilitate control of and display of various operational aspects of the vehicle 100.

In some embodiments, the first data bandwidth 1706 is >1 Mbps, and the second data bandwidth 1708 is <1 Mbps.

Figure 18:
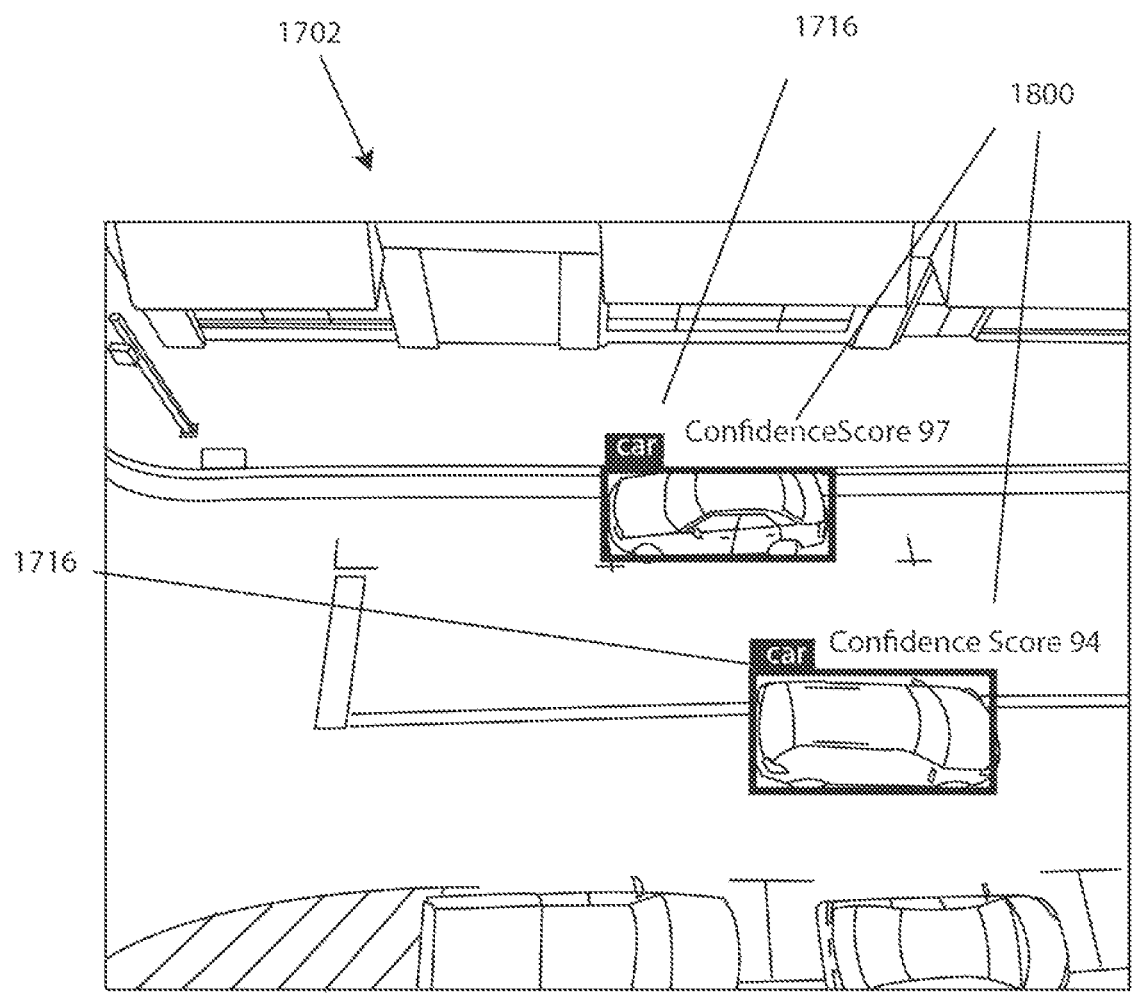
FIG. 18 shows exemplary still image information that can be used as part of the distilled data for an embodiment of the vehicle.
Figure 19:
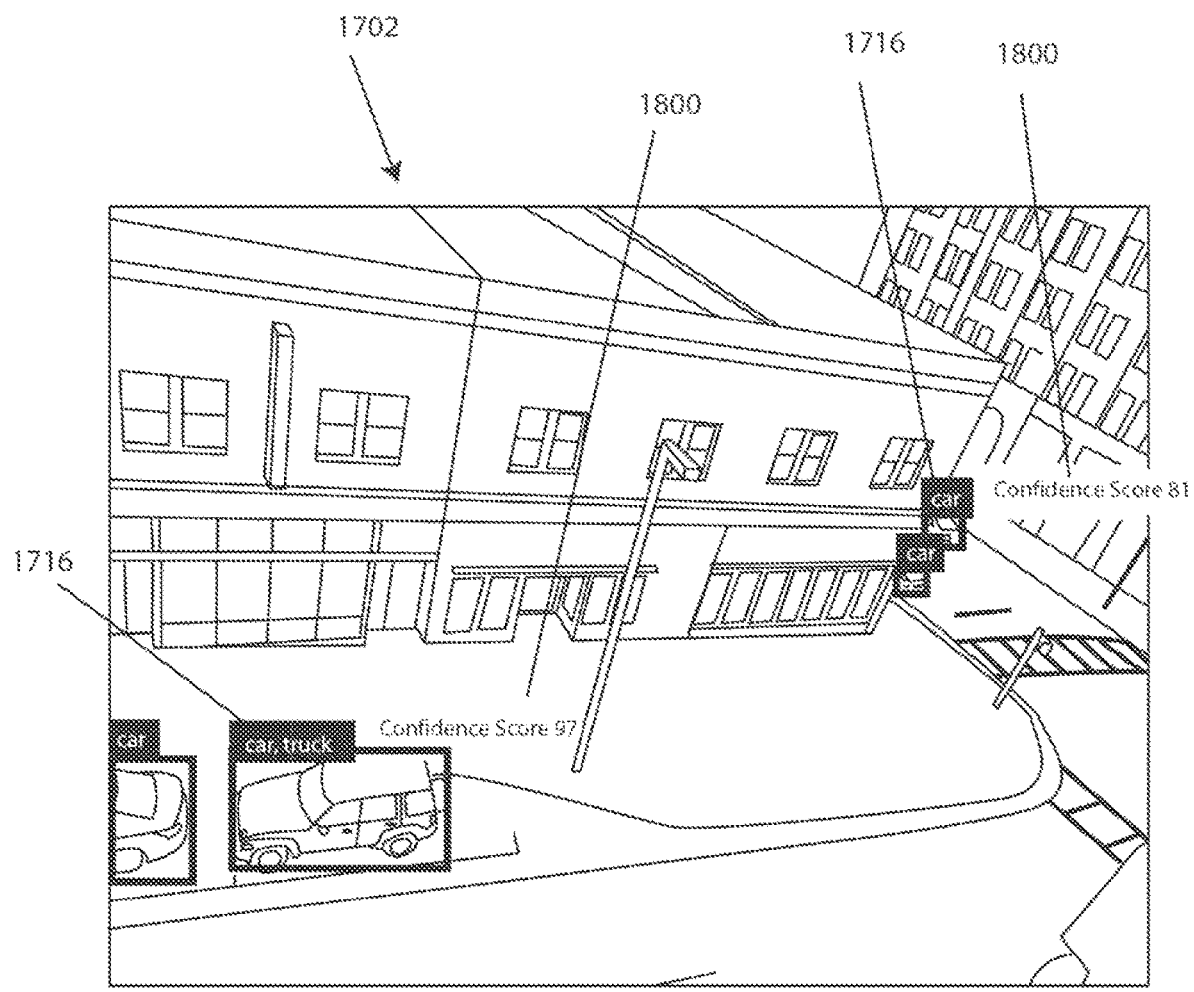
FIG. 19 shows exemplary still image information that can be used as part of the distilled data for an embodiment of the vehicle.

Referring to FIG. 18-19, in some embodiments, the surveillance module 1100 is configured to use machine learning as part of the object classification and localization technique, the machine learning generating a confidence score 1800 for each identified object 1716, the confidence score 1800 being a probabilistic measure of the identified object falling within a match parameter of a learned object. As noted herein, the surveillance processor 1106 can be associated with a memory that stores computer program code having a library of objects from which the surveillance processor 1106 uses as a comparison to identify an object 1716 in the raw data 1700, and the computer program code can cause the surveillance processor 1106 to positively identify the object 1716 (e.g., identify it as a vehicle for example) based on a threshold value of the confidence score 1800. The matched parameter used in the object classification and localization technique can be the shape, size, location, etc. of the object that falls within the learned shapes, sizes, locations, etc. of a vehicle.

In some embodiments, the surveillance module 1100 is configured to include the identified object 1716 with the still image information only when the confidence score is >80% or some selectable or configurable threshold as determined by a user. The object classification and localization technique can omit or remove at least some objects 1716 (objects other than the ones identified as vehicles) from the distilled data 1702 so that the still image information is a filtered image of the AOO or AOI. In addition, or in the alternative, the object classification and localization technique can only identify objects that have a confidence score 1800 greater than a threshold value, and otherwise does not identify them, but still generates an image of the object 1716 (identified or not) to include in the distilled data 1702.

In some embodiments, the surveillance module 1100 is configured to display the confidence score 1800 associated with each identified object 1716 within the distilled data 1702. For example, the virtual printout forming a file of the image of the environment 1718 can include each identified object 1716 with its associated confidence score 1800 juxtaposed with the object 1716.

In some embodiments, the surveillance module 1100 is configured to convert the still image information into a Portable Document Format (PDF) file or another file format. For instance, the virtual printout file can be in PDF format, XML format, RTF format, DOC format, RTF format, etc.

In some embodiments, the navigation module 1102 is configured to generate vehicle 100 coordinates and the surveillance module 1100 is configured to use the vehicle 100 coordinates and a ranging technique to generate object coordinates for the at least one identified object. For instance, a GPS of the navigation module 1102 can be used to track the time and location of the vehicle 100, and a laser range finder can be used to determine the location (e.g., via optical triangulation, etc.) of objects 1716 relative to the vehicle 100.

In some embodiments, the navigation module 1102 is configured for navigation and propulsion of an autonomous vehicle 100. As noted herein, embodiments of the vehicle 100 can be configured to be operated remotely by a user, autonomously, or semi-autonomously.

A method of surveillance can involve receiving raw data 1700 at a first data bandwidth 1706, the raw data 1700 including real time video stream information about an environment 1718.

The method of surveillance can involve generating distilled data 1702, the distilled data 1702 including still image information from the real time video stream information, the still image information including at least one object 1716 identified via an object classification and localization technique.

The method of surveillance can involve transmitting the distilled data 1702 at a second data bandwidth 1708, the first data bandwidth 1706 being greater than the second data bandwidth 1708.

In some embodiments, the method of surveillance can involve the first data bandwidth 1706 being >1 Mbps, and the second data bandwidth 1708 being <1 Mbps.

In some embodiments, the object classification and localization technique involves machine learning to generate a confidence score 1800 for each identified object 1716, the confidence score 1800 being a probabilistic measure of the identified object 1716 falling within a match parameter of a learned object.

In some embodiments, the method of surveillance can involve including the identified object 1716 with the distilled data only when the confidence score 1800 is >80% or some selectable or configurable threshold as determined by a user.

In some embodiments, the method of surveillance can involve displaying the confidence score 1800 associated with each identified object 1716 within the distilled data 1702.

In some embodiments, generating the distilled data 1702 involves converting the still image information into a Portable Document Format (PDF) file or another file format.

An operating module 202 for a vehicle can include a navigation module 1102 including a navigation processor 1110 and a navigation sensor 1112, the navigation module 1102 configured to communicate with a motor 110 (or at least one motor 110) of the vehicle 100 for navigation and propulsion of the vehicle 100.

The operating module 202 for a vehicle 100 can include a surveillance module 1100 including a surveillance processor 1106 and a surveillance sensor 1108, the surveillance module 1100 configured to: receive raw data 1700, the raw data 1700 including real time video stream information about an environment 1718; and process the raw data 1700 to generate distilled data 1702, the distilled data 1702 including a still image information from the real time video stream information, the still image information including at least one object 1716 identified via an object classification and localization technique.

The operating module 202 for a vehicle 100 can include a telemetry module 1104 including a telemetry processor 1114 and a telemetry transceiver 1116, the telemetry module 1104 configured to transmit the distilled data 1702 to a computer device 1712.

In some embodiments, the navigation module 1102 generates vehicle 100 coordinates and the surveillance module 1100 uses the vehicle 100 coordinates and a ranging technique to generate object coordinates for the at least one object 1716.

In some embodiments, the surveillance module 1100 co-registers the object coordinates with the at least one object 1716 and includes the co-register object coordinates as part of the distilled data 1702.

In some embodiments, the navigation module 1102 includes a GPS sensor.

In some embodiments, the surveillance module 1100 includes a Graphics Processing Unit (GPU) processor.

In some embodiments, the telemetry module 1104 includes a gateway transceiver.

Some embodiments can include a communications network 1710 configured to facilitate communication between the telemetry module 1104 and the computer device 1712, wherein: the surveillance module 1100 is configured to receive the raw data 1700 at a data bandwidth of >1 Mbps; and the telemetry module 1104 is configured to transmit the distilled data 1702 at a data bandwidth of <1 Mbps.

In some embodiments, the surveillance module 1100 is configured to use machine learning as part of the object classification and localization technique, the machine learning generating a confidence score 1800 for each identified object 1716 that is a probabilistic measure of the identified object 1716 falling within a match parameter of a learned object.

In some embodiments, the surveillance module 1100 is configured to include the identified object 1716 with the distilled data 1702 only when the confidence score is >80% or some selectable or configurable threshold as determined by a user.

In some embodiments, the surveillance module 1100 is configured to display the confidence score 1800 associated with each identified object within the distilled data 1702.

In some embodiments, the surveillance module 1100 is configured to convert the distilled data 1702 into a Portable Document Format (PDF) file or another file format.

In some embodiments, the navigation module 1102 is configured for navigation and propulsion of an autonomous vehicle 100.

A method of surveillance can involve receiving raw data 1700 at a first data bandwidth 1706, the raw data 1700 including real time video stream information about an environment 1718.

The method of surveillance can involve generating distilled data 1702 from the raw data 1700, the distilled data 1702 including a still image information from the real time video stream information, the still image information including at least one object 1716 identified via an object classification and localization technique.

The method of surveillance can involve co-registering object coordinates for the at least one identified object as part of the distilled data 1702.

The method of surveillance can involve transmitting distilled data 1702 at a second data bandwidth 1708.

The method of surveillance can involve the first data bandwidth 1706 being >1 Mbps, and the second data bandwidth 1708 being <1 Mbps.

In some embodiments, the object classification and localization technique involves machine learning to generate a confidence score 1800 for each identified object 1716, the confidence score 1800 being a probabilistic measure of the identified object 1716 falling within a match parameter of a learned object.

The method of surveillance can involve including the identified the object 1716 with the distilled data 1702 only when the confidence score 1800 is >80% or some selectable or configurable threshold as determined by a user.

The method of surveillance can involve displaying the confidence score 1800 associated with each identified object within the distilled data 1702.

The method of surveillance can involve generating the distilled data 1702 involves converting the still image information into a Portable Document Format (PDF) file or another file format.

Embodiments of the method disclosed herein can provide a platform for a vehicle 100 that can be made in an inexpensive and quick manner, using additive manufacturing capabilities. With the use of FEA, build files for the additive manufacturing apparatus 1714 can be made to generate vehicle designs having limited number of parts and that do not require any tools for assembly. This can allow the vehicle 100 to be assembled by a single person in less than four minutes. In addition, embodiments of the vehicle 100 can be fabricated to make disposable component parts, which can save dedicated storage space (e.g., a user does not have to carry already-made spare and replacement parts on his/her person) and provide convenient, print-on-demand replacement parts. In addition, embodiments of the vehicle 100 can allow for faster and easier maintenance (comparable to known systems). For example, a damaged arm 104 can be replaced without tools in less than 30 seconds.

Use of additive manufacturing for fuselage components of an unmanned aerial vehicle 100 can reduce the logistics required for spare parts since replacement parts can be manufactured one the spot in forward deployed locations (e.g., locations that would otherwise require significant time, resources, and logistical support to supply spare parts). The design of the vehicle 100 can be modular to allow for multiple payload packages that can be carried by different replaceable payload housings 200. This can be used to meet different mission scenarios in real-time. Additionally, this allows for compact packaging to support soldiers transporting the system, as the vehicle 100 does not require tools for assembly. This again reduces the logistics that would otherwise be required for special tools and test equipment.

Some embodiments can provide an unmanned aerial vehicle 100 that weighs at little as five pounds and takes up less than 420 cubic inches of space (when assembled), and even less space when disassembled. When assembled, the vehicle 100 can occupy one tenth the space of standard U.S. Army ruck-sack.

Embodiments of the vehicle 100 can be designed for autonomous flight regimes, which can reduce the user's workload during operations. In some embodiments, the vehicle 100 can include onboard intelligence collection and analysis using computer vision and machine learning technologies and algorithms. This eliminates the need to stream full motion video back to ground stations (e.g., back to the computer device 1712) for further analysis and processing, reducing the time, resource, and spectrum bandwidth requirements by orders of magnitude from known unmanned intelligence, surveillance, and reconnaissance applications.

The on-board processing of the surveillance processor 1106 allows for the software used by the operating module 202 to be highly customizable, which can allow the user to focus of the surveillance on predetermined objects 1716 rather than spending time and resources looking through and analyzing all of the objects 1716 captured by each frame. For example, the user can choose to focus on information such as the presence of enemy tanks or sniper nests in broken windows. In addition to saving time, the bandwidth required to send information is also greatly decreased, since only targeted images are sent to the computer device 1712 instead of a live, full-motion video. The machine learning capabilities of the vehicle 100 can decrease the time and effort it takes the user (or the computer device 1712) to receive and analyze intel by pushing the collection and processing of the intel onboard the operating module 202 rather than having the user pull the data to their location (e.g., the computer device 1712).

Some embodiments of the vehicle 100 can have a body 102 including at least one mount 112, each mount 112 configured to secure a motor 110. For instance, the body 102 may not be configured to have a body cavity 306.

The vehicle 100 can have a payload including at least one operating module 202 for the vehicle 100. For instance, the vehicle 100 may not include a payload housing 200.

The vehicle 100 can include at least one interlocking arrangement 308 configured to removably secure the payload to the body 102. For example, the payload can have a corresponding interlocking arrangement 308 and/or a structural formation (configured to engage the interlocking arrangement 308) to facilitate securing the payload to the body 102.

The body 102 can be structured with additive manufactured material.

Each mount 112 can be disposed in or on a structure extending from the body 102 and/or removably attached to the body 102.

The structure can include any one or combination of: a pillared structure, a tripod structure, a crossbar structure, a pyramid structure, and an arm 104. For instance, the body 102 can have at least one pillar, tripod, or pyramid structure extending from a surface of the body 102. Other shaped structured can be used. The mounts 112 can be disposed in or on any one or combination of these structures. As another example, the body 102 can have risers, pillars, sidewalls 302, etc. extending from a surface of the body 102 that are connected by a crossbar. The mounts 112 can be disposed in or on the crossbar.

In some embodiments, the structure is configured to extend orthogonally or non-orthogonally from a top of the body 102, orthogonally or non-orthogonally from a bottom of the body 102, and/or orthogonally or non-orthogonally from a side of the body 102. This can be done to facilitate supporting the motors 110 (attached to the mounts 112) in a manner that is conducive for the type of propulsion used by the vehicle 100.

In some embodiments, the structure is configured as an arm 104 and the at least one interlocking arrangement 308 is configured to removably secure the arm 104 to the body 102.

In some embodiments, the structure includes a hinged joint. The hinged joint can be a barrel hinge, pivot hinge, spring hinge, a socket and pinion joint, etc.

In some embodiments, the structure is pivoted about the hinged joint to transition the structure to and from a stowed position and a deployed position. For instance, the structure can include a first structure member hingedly connected to a second structure member. The first structure member can be attached to the body 102 via the interlocking arrangement 308. The second structure member can be configured to have the mount 112. Either the first structure member or the second structure member can have a channel that is sized and shaped to receive the other structure member. For instance, the first structure member has a channel that is sized and shaped to receive the second structure member so that when the second structure member is rotated about the hinged joint the first structure member receives the second structure member. When the second structure member is received within the first structure member, this can form the stowed position. When then second structure member is extended out from the channel of the first structure member, this can form the deployed position. A locking mechanism (e.g., a locking tab, a slide pin, a pin and detent feature, etc.) can be used to selectively lock the structure in the stowed and/or deployed position.

As another example, the body 102 can have the channel or a sleeve configured to receive the second structure member. The second structure member can be rotated about the hinged joint so that the channel or sleeve of the body 102 receives the second structure member. When the second structure member is received within the channel or sleeve, this can form the stowed position. When then second structure member is extended out from the channel or sleeve, this can form the deployed position. Again, a locking mechanism can be used to selectively lock the structure in the stowed and/or deployed position.

Transitioning the structures to and from the stowed and deployed positions can allow a user to compact the vehicle 100 so as to occupy a smaller volume of space (e.g., when in the stowed position) and expand the vehicle 100 when ready for operational use (e.g., when in the deployed position).

In some embodiments, the body 102 can be configured as any one or combination of: a walled member having a body cavity 306 formed within the body 102, the body cavity 306 being configured to receive the payload; a single planar member configured to support the payload on a surface thereof; and plural planar members configured to retain the payload by sandwiching the payload. Embodiments of the walled member (e.g., the body 102 having sidewalls 302) are described above.

The body 102 being formed as a single planar member can include an interlocking arrangement 308 disposed in or on a surface of the single planar member to facilitate securement of the payload, payload housing 200, and or arm 104.

The body 102 being formed as plural planar members can include an interlocking arrangement 308 disposed in or on a surface of any one or combination of planar members to facilitate securement of the payload, the payload housing 200, and/or the arm 104. In one embodiment, the plural planar members can include a first planar member and a second planar member. The first planar member can have an interlocking arrangement 308 to facilitate securement of the second planar member, the payload, payload housing 200, and/or the arm 104. The second planar member can have an interlocking arrangement 308 to facilitate securement of the first planar member, the payload, payload housing 200, and/or the arm 104. As a non-limiting, example, the first planar member can have an interlocking arrangement 308 to facilitate securement of the payload and/or payload housing 200. An additional interlocking arrangement 308 can be disposed on the first planar member to facilitate securement of the second planar member so that the second planar member sandwiches the payload and/or payload housing 200.

In some embodiments, the motor 110 is configured to drive a propulsion means for the vehicle 100. The propulsion means can include any one or combination of an impeller, a propeller 802, a thruster, and a drivetrain. As noted above, the vehicle 100 can be configured as an aerial vehicle, a land vehicle, water vehicle, and/or space vehicle. If the vehicle 100 is intended for use as a land vehicle, the propulsion means may be a drivetrain. If the vehicle 100 is intended for use as a water vehicle, the propulsion means may be an impeller or thruster. If the vehicle 100 is intended for use as an aerial vehicle, the propulsion means may be a propeller. If the vehicle 100 is intended for use as a space vehicle, the propulsion means may be a thruster.

A method of producing a vehicle 100 can involve generating a body 102 via additive manufacturing. The method can involve generating a payload including at least one operating module 202 for the vehicle 100. At least one interlocking arrangement 308 can be included in or on the body 102 and be configured to removably secure the payload to the body 102 by manual assembly. The term manual assembly used herein includes assembly via a tool-less fashion (e.g., without the use of tools).

The method can involve generating at least one structure via additive manufacturing with a mount 112 disposed therein or thereon. The mount 112 can be configured to secure a motor 110.

The method can involve generating the structure so as to be removably secured to the body 102 via at least one interlocking arrangement 308.

The method can involve generating a payload housing 200 via additive manufacturing. The payload housing 200 can be configured to retain the payload and be configured to be removably secured to the body 102 via at least one interlocking arrangement 308.

In at least one embodiment, the method can involve generating at least one structure via additive manufacturing with a mount 112 disposed therein or thereon, the mount 112 being configured to secure a motor 110. In addition, at least one structure can be removably secured to the body 102 via at least one interlocking arrangement 308. The method can involve generating a payload housing 200 via additive manufacturing, the payload housing 200 being configured to retain the payload and configured to be removably secured to the body 102 via at least one interlocking arrangement 308.

In some embodiments, the method can involve any one or combination of the body 102, the structure, and the payload housing 200 being generated via additive manufacturing performed at a first location and/or a second location. The first location can be a manufacturing facility. The second location can be an area at or near an environment 1718 within which the vehicle 100 will be operated. For instance, a first additive manufacturing apparatus 1714 can be located at the first location and a second additive manufacturing apparatus 1714 can be located at the second location. Being near the environment 1718 can include being within operational reach of the environment 1718 (e.g., the vehicle 100 can be navigated to the environment 1718 from the second location and still have enough power to allow it to effectively perform its intended function and still be within range so as to allow for telecommunication between it and the computer device 1712). None, some, or all of the component parts of the vehicle 100 can be fabricated using the first additive manufacturing apparatus 1714, while none, some or all components are fabricated using the first additive manufacturing apparatus 1714. The determination of which components are made using the first additive manufacturing apparatus 1714 and which component parts are made using the second additive manufacturing apparatus 1714 can be based on the intended use of the vehicle 100 and the environmental constraints associated with that use. For instance, the vehicle 100 may be intended to use by a soldier in the field to gather intelligence about the environment 1718. The soldier may have to carry the components of the vehicle 100 and/or the second additive manufacturing apparatus 1714 to the second location. Factors of: a) the burden of carrying the equipment; b) the ability and speed with which the second additive manufacturing apparatus 1714 can fabricate component parts; c) mission constraints (e.g., operational security, weather conditions, etc.); etc. will dictate which component parts are made using the first additive manufacturing apparatus 1714 and which component parts are made using the second additive manufacturing apparatus 1714.

If any of the components becomes damaged or requires re-design, any of the components can be fabricated for such purposes using any one or combination of the first additive manufacturing apparatus 1714 and the second additive manufacturing apparatus 1714.

The method can involve determining, via Finite Element Analysis ("FEA"), design criteria (e.g., shape and configuration) of any one or combination of the body 102, the structure, and the payload housing 200.

In some embodiments, the FEA uses operational parameters related to a type of propulsion for which the motor 110 is configured, a type of surveillance for which the operating module 202 is configured, and/or environmental constraints (e.g., weather conditions, atmospheric altitude, water depth, pressure conditions, temperature conditions, chemical exposure conditions, radiation exposure conditions, light exposure conditions, low earth orbit conditions, other planetary conditions, outer-space conditions, etc.) within which the vehicle 100 will be operated.

In some embodiments, the environmental constraints include any one or combination of: transport of the second additive manufacturing apparatus 1712 and/or components of the vehicle 100 to the second location. The components can include the body 102, the structure, the payload, the payload housing 200, raw material for the build, the motor 110, a battery unit, circuitry, sensors, propulsion means (e.g., an impeller, a propeller 802, a thruster, a drivetrain, etc.), and ability and speed with which the additive manufacturing at the second location generates components of the vehicle 100.

It will be understood that modifications to the embodiments disclosed herein can be made to meet a particular set of design criteria. For instance, any of vehicles 100, operating modules 202, surveillance modules 1100, navigation modules 1102, telemetry modules 1104, communications network 1710 components, body portions 102, arm portions 104, payload housing portions 200, motors 110, or any other component can be any suitable number or type of each to meet a particular objective. Therefore, while certain exemplary embodiments of the vehicle 100 and methods of using the same disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein. Additionally, the disclosure of a range of values is a disclosure of every numerical value within that range, including the end points.

What is claimed is:

1. A vehicle, comprising:
   a body having a body bottom conjoined with a body sidewall and a body top forming a body cavity, wherein the body top includes a body top opening and the body sidewall includes a body sidewall opening;
a payload housing having a payload bottom conjoined with a payload housing sidewall and a payload housing top forming a payload housing cavity, wherein the payload housing cavity is configured to hold at least one operating module for the vehicle;
at least one arm; and
a first interlocking arrangement of the body top opening and payload housing sidewall configured to removably secure the payload housing to the body, wherein the payload housing is configured to be seated within the body through the body top opening;
a second interlocking arrangement of the at least one arm and the body sidewall, the second interlocking arrangement configured to removably attach the at least one arm to the body,
wherein a portion of the payload housing covers the second interlocking arrangement when the payload is seated within the body,
wherein each of the body, the payload housing, and the at least one arm are structured with additive manufactured material.

2. The vehicle recited in claim 1, wherein each of the body, the payload housing, and the at least one arm are structured entirely with additive manufactured material.

3. The vehicle recited in claim 1, comprising:
a cover structured with additive manufactured material, wherein the first interlocking arrangement is configured to removably secure the cover to the body.

4. The vehicle recited in claim 1, wherein the first interlocking arrangement and the second interlocking arrangement are configured to be manually transitioned between an engaged configuration and a disengaged configuration.

5. The vehicle recited in claim 1, wherein the at least one arm includes plural arms.

6. The vehicle recited in claim 1, wherein the at least one arm includes a failure point configured to facilitate mechanical failure of the at least one arm upon experiencing a threshold force vector before transferring the threshold force vector to another component of the vehicle.

7. The vehicle recited in claim 1, wherein the vehicle is configured to be an aerial vehicle, a land vehicle, and/or a water vehicle.

8. The vehicle recited in claim 1, wherein the vehicle is configured to be an autonomous vehicle.

9. The vehicle recited in claim 1, wherein the at least one first interlocking arrangement or the second interlocking arrangement includes a rail-and-guide engagement.

10. The vehicle recited in claim 1, wherein the at least one arm includes at least one motor configured to propel the vehicle.

11. The vehicle recited in claim 10, wherein the at least one arm includes an electrical connector conduit configured to route an electrical connector from the at least one motor to facilitate electrical communication between the motor and the at least one operating module.

12. The vehicle recited in claim 1, wherein the at least one operating module includes a navigation module, a surveillance module, and/or a telemetry module.

13. The vehicle recited in claim 12, wherein the navigation module is an avionics module.

14. The vehicle recited in claim 1, wherein the at least one arm extends in a direction orthogonal to the second interlocking arrangement, the second interlocking arrangement associated with the payload housing is configured to slidably engage with the body in a longitudinal direction.

15. The vehicle recited in claim 14, wherein the at least one arm is configured to transfer a force vector to the body when the force vector meets a specified threshold.

16. A method of using a vehicle, the vehicle including a body and a payload housing, the body having a body bottom conjoined with a body sidewall and a body top forming a body cavity, wherein the body top includes a body top opening and the body sidewall includes a body sidewall opening, the payload housing having a payload bottom conjoined with a payload housing sidewall and a payload housing top forming a payload housing cavity, wherein the payload housing cavity is configured to hold at least one operating module for the vehicle, the method comprising:
manually assembling the payload housing to the body via a first interlocking arrangement of the body top opening and the payload housing side wall and manually assembling the at least one arm to the body via a second interlocking arrangement of the at least one arm and the body sidewall, wherein the payload housing is configured to be seated within the body through the body top opening and includes a portion that extends over the first interlocking arrangement associated with the body when seated, wherein the first interlocking arrangement is configured to secure the payload housing to the payload housing sidewall, and the second interlocking arrangement is configured to secure the at least one arm to the body;
seating the payload housing within the body by the first interlocking arrangement, wherein a portion of the payload housing covers the second interlocking arrangement when the payload housing is seated; and
manually attaching at least one motor to the at least one arm.

17. The method recited in claim 16, comprising:
fabricating the body, the payload housing, and the at least one arm via additive manufacturing.

18. The method recited in claim 16, wherein the payload housing includes plural payload housings having a first payload housing and a second payload housing, the method comprising:
manually securing the first payload housing via the first one interlocking arrangement;
manually removing the first payload housing to disengage the first interlocking arrangement;
manually securing the second payload housing via the first interlocking arrangement.

19. The method recited in claim 16, comprising:
receiving raw data including real time video stream information about an environment; and
generating distilled data including still image information from the real time video stream information, the still image information including at least one object identified via an object classification and localization technique.

20. The method recited in claim 19, comprising:
receiving first raw data;
manually removing a first payload housing to disengage the first interlocking arrangement;
manually securing a second payload housing via the first interlocking arrangement; and
receiving second raw data;
wherein the first raw data is different from the second raw data.

21. The method recited in claim 19, comprising:
receiving raw data and transmitting first distilled data;

manually removing a first payload housing to disengage the first interlocking arrangement;

manually securing a second payload housing via the first interlocking arrangement; and receiving raw data and transmitting second distilled data;

wherein the first distilled data is different from the second distilled data.

22. The method recited in claim 19, comprising:
receiving the raw data at a first data bandwidth; and
transmitting the distilled data at a second data bandwidth, the second data bandwidth being less than the first data bandwidth.

23. The method recited in claim 22, wherein:
the first data bandwidth is >1 Mbps; and
the second data bandwidth is <1 Mbps.

24. A vehicle, comprising:
a body including a body bottom conjoined with a body sidewall and a body top forming a body cavity, wherein the body top includes a body top opening;
a payload including a payload bottom conjoined with a payload housing sidewall, a payload housing top forming a payload housing cavity, and at least one operating module in the payload housing cavity;
a first interlocking arrangement of the body top opening and the payload housing sidewall, the first interlocking arrangement configured to removably secure the payload housing to the body;
a second interlocking arrangement of at least one structure and the body sidewall, the second interlocking arrangement configured to removably attach the at least one structure to the body,
wherein a portion of the payload housing covers the second interlocking arrangement when the payload is seated within the body, and
wherein the body is structured with additive manufactured material.

25. The vehicle recited in claim 24, wherein the body is configured as any one or combination of:
a single planar member configured to support the payload on a surface thereof; and
plural planar members configured to retain the payload by sandwiching the payload.

26. The vehicle recited in claim 24, wherein a mount is disposed in or on the structure, the structure extending from the body, wherein each mount is configured to secure a motor.

27. The vehicle recited in claim 26, wherein the structure includes any one or combination of: a pillared structure, a tripod structure, a crossbar structure, a pyramid structure, and an arm.

28. The vehicle recited in claim 27, wherein the structure is configured to extend orthogonally or non-orthogonally from a side of the body.

29. The vehicle recited in claim 27, wherein the structure is configured as an arm and the second interlocking arrangement is configured to removably secure the arm to the body.

30. The vehicle recited in claim 26, wherein the structure includes a hinged joint.

31. The vehicle recited in claim 30, wherein the structure is pivoted about the hinged joint to transition the structure to and from a stowed position and a deployed position.

32. The vehicle recited in claim 26, wherein the structure is configured to extend in a direction orthogonal to the second interlocking arrangement, the second interlocking arrangement configured to slidably engaging with the body in a longitudinal direction.

33. The vehicle recited in claim 32, wherein the structure is configured to transfer a force vector to the body when the force vector meets a specified threshold.

34. The vehicle recited in claim 24, wherein the motor is configured to drive a propulsion means for the vehicle.

35. The vehicle recited in claim 34, wherein the propulsion means includes any one or combination of an impeller, a propeller, a thruster, and a drivetrain.

\* \* \* \* \*